US011301460B2

(12) United States Patent
Rich et al.

(10) Patent No.: US 11,301,460 B2
(45) Date of Patent: Apr. 12, 2022

(54) PLATFORM FOR CREATING AND USING ACTIONABLE NON-FUNGIBLE TOKENS (KNFT)

(71) Applicant: Peoplebrowsr, Inc., Burlingame, CA (US)

(72) Inventors: John David Rich, Vaucluse (AU); Cameron Bale, Saint-Lambert (CA); Andrew Maizels, Hornsby (AU); Andrew Horn, Seven Hills (AU); Angela Ung, Bonbeach (AU); Fagner Lordello, Potts Point (AU)

(73) Assignee: Peoplebrowsr Inc., Burligame, CA (US)

( * ) Notice: Subject to any disclaimer, the term of this patent is extended or adjusted under 35 U.S.C. 154(b) by 261 days.

(21) Appl. No.: 16/750,992

(22) Filed: Jan. 23, 2020

(65) Prior Publication Data

US 2020/0242105 A1 Jul. 30, 2020

Related U.S. Application Data

(60) Provisional application No. 62/796,469, filed on Jan. 24, 2019.

(51) Int. Cl.
| | |
|---|---|
| *G06F 15/16* | (2006.01) |
| *G06F 16/23* | (2019.01) |
| *G06F 16/27* | (2019.01) |
| *G06Q 50/00* | (2012.01) |
| *H04L 67/1097* | (2022.01) |

(Continued)

(52) U.S. Cl.
CPC .......... *G06F 16/2379* (2019.01); *G06F 9/547* (2013.01); *G06F 16/27* (2019.01); *G06Q 50/01* (2013.01); *H04L 67/104* (2013.01); *H04L 67/1097* (2013.01)

(58) Field of Classification Search
CPC ...... G06F 16/2379; G06F 16/27; G06F 9/547; H04L 67/104; H04L 67/1097; G06Q 50/01
See application file for complete search history.

(56) References Cited

U.S. PATENT DOCUMENTS

| | | | | |
|---|---|---|---|---|
| 2009/0287837 | A1* | 11/2009 | Felsher | G06Q 10/10 709/229 |
| 2010/0235285 | A1* | 9/2010 | Hoffberg | G06Q 20/401 705/75 |

(Continued)

*Primary Examiner* — Razu A Miah
(74) *Attorney, Agent, or Firm* — Boag Law, PLLC

(57) ABSTRACT

A distributed computing platform and method for creating actionable digital assets and tokens incorporating influence and outreach ("KNFT"). A KNFT application server may be configured to receive, over a distributed computing network from a remote computing node, a request for a new non-fungible token wherein the KNFT comprises a unique KNFT identifier, at least one metadata element, and least one social vector. A blockchain proxy server may be operatively connected to the KNFT application server and to a distributed blockchain ledger. Social actions may comprise user comment, connection, direct message, like, or favorable rating, and a change in ownership of the KNFT may be written to the social vector by a KNFT API. The social vector may comprise social vector data from at least one prior owner, and the KNFT may further comprise a circulation trail vector that incorporates the ownership history of the KNFT.

24 Claims, 22 Drawing Sheets block diagram of an exemplary KNFT platform

(51) Int. Cl.
    *H04L 67/104*    (2022.01)
    *G06F 9/54*      (2006.01)

(56)            References Cited

U.S. PATENT DOCUMENTS

| | | | |
|---|---|---|---|
| 2016/0321654 A1* | 11/2016 | Lesavich | G06Q 20/321 |
| 2017/0048235 A1* | 2/2017  | Lohe     | G06Q 20/065 |
| 2017/0083907 A1* | 3/2017  | McDonough | G06Q 20/3829 |
| 2017/0148016 A1* | 5/2017  | Davis    | G06Q 20/389 |
| 2017/0236143 A1* | 8/2017  | Code     | G06Q 20/387 |
| | | | 705/14.27 |
| 2018/0198617 A1* | 7/2018  | Drouin   | G06T 19/006 |
| 2018/0268401 A1* | 9/2018  | Ortiz    | G06Q 20/204 |
| 2019/0180308 A1* | 6/2019  | Ziedan   | G06Q 40/02 |
| 2019/0295050 A1* | 9/2019  | Chalkias | G06Q 20/3827 |
| 2019/0299105 A1* | 10/2019 | Knight   | G07F 17/3244 |
| 2019/0318425 A1* | 10/2019 | Tilley   | G06Q 40/06 |
| 2019/0340013 A1* | 11/2019 | Celia    | G06F 9/5005 |

* cited by examiner

*block diagram of an exemplary KNFT platform*

*exemplary KNFT template forms*

*exemplary actions to be used with KNFTs*

*exemplary KNFT platform*

*exemplary slate of customizations for a KNFT card*

*exemplary KNFT bundle*

*Kred Score badge, showing influence and outreach metrics*

*graph illustrating the relationship between influence points and score*

*a sample distribution of global Kred influence scores*

*sample conversion between Outreach Points and Outreach Level*

| KNFT Points for Influence | Points Earned |
|---|---|
| Selling an NFT - Points per 1 ETH of Sale Value | 100 Points |
| Trading an NFT for another | 20 Points |
| Someone likes your KNFT | 3 Points |
| Someone comments on your KNFT | 5 Points |

| KNFT Points for Outreach | Points Earned |
|---|---|
| Buying an NFT - Points per 1 ETH of Sale Value | 100 Points |
| Trading an NFT for another | 20 Points |
| You like someone else's KNFT | 3 Points |
| You comment on someone else's KNFT | 5 Points |
| Following an NFT Owner | 5 Points |

FIG. 11
*exemplary KNFT points table*

*sample influence and outreach activity statement*

*exemplary layout for a KNFT system*

*steps in creating and managing a KNFT*

*scheme for notifying users that they have received a KNFT*

*exemplary leaderboard of global KNFT givers*

*exemplary newsfeed providing information to users on KNFT activity*

*exemplary marketplace for buying, selling, and auctioning KNFTs*

*exemplary circulation trail for a KNFT*

Circulation  Requests
 5    1             ♥ 1  ( SELL )  

Comments

Luke Harris
Thanks to everyone who joined us at the weekend's Kitesurfing Annual Meetup! I'm sharing these NFTs to commemorate my 20' high personal best jump!
         

Will Jones FOLLOW
Great to see you, Luke. Also, loved my new NFT ! Excited to start collecting others!
         

Sarah Harris
Every time I see one of these NFTs it makes me smile 😊
         

FIG. 20
*exemplary comment trail for a KNFT*

*exemplary KNFT coin wallet*

*exemplary KNFT use cases*

*depicts a KNFT as part of a batch*

*rendering of the user-facing elements of a Kred Domain Token*

*depiction of a locked offer notification*

PLATFORM FOR CREATING AND USING ACTIONABLE NON-FUNGIBLE TOKENS (KNFT)

PRIORITY CLAIM

This application claims priority to U.S. Patent Application No. 62/796,469, filed Jan. 24, 2019 and titled, "A PLATFORM FOR CREATING AND USING ACTIONABLE NON-FUNGIBLE TOKENS (KNFT)," the contents of which is incorporated by reference in its entirety.

BACKGROUND

The market for virtual goods has been growing since the creation of the internet and has achieved significant milestones. For example, in 2010 a virtual space station in the game Entropia Universe sold for US$330,000. In late 2017, the AxiumZen team released CryptoKitties, the first blockchain powered game in which users can buy, collect, breed, and sell virtual collectible cats. In February 2018, Kevin Abosch, a digital artist, released and sold a single ERC20 Coin "The Forever Rose" for US$1,000,000. Marketplaces for these virtual goods have also become commonplace, including Opensea, Rarebits and Wax.io.

Existing Social Networks provide limited data ownership and control to users. Blockchain technology provides an open, decentralized and immutable system for data storage and processing.

What is needed is a platform for rapidly creating actionable digital assets and tokens with influence and outreach that include social actions, scoring, redemption actions, and royalty distribution.

A new class of blockchain-powered digital assets—known individually as a Kred non-fungible tokens (KNFTs)—and a platform for creating, trading, collaborating, engaging, collateralizing, and monitoring these digital assets is described herein, which is particularly suited for giving, tracking, collaborating, game-playing, and holding value, among other features.

BRIEF DESCRIPTION OF THE DRAWINGS

The features and advantages of the present disclosure will be more fully understood with reference to the following detailed description when taken in conjunction with the accompanying figures, wherein:

FIG. 11 illustrates an exemplary KNFT points table, according to aspects of the present disclosure.

FIG. 20 illustrates a exemplary comment trail for a KNFT, according to aspects of the present disclosure.

SUMMARY

Figure 1:
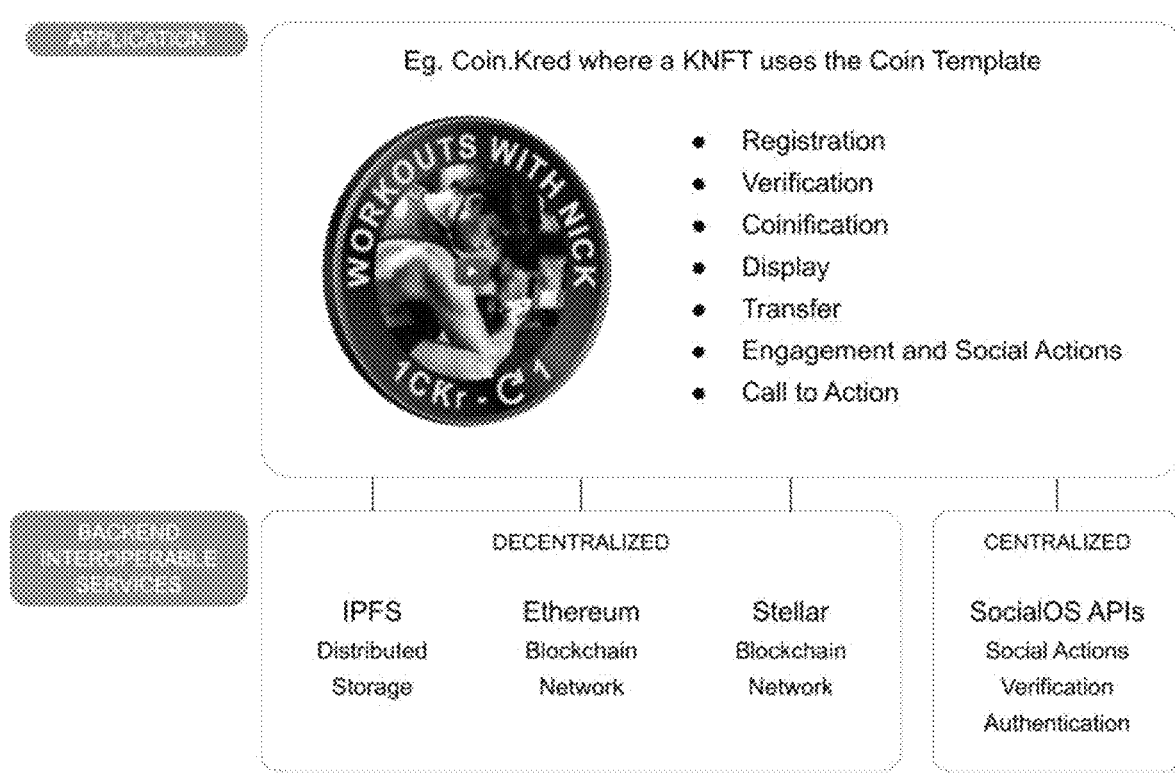
FIG. 1 is a block diagram of an exemplary KNFT platform, according to aspects of the present disclosure.

In embodiments of the invention, a distributed computing platform is disclosed for creating actional digital assets and tokens incorporating influence and outreach. A KNFT application server may be configured to receive, over a distributed computing network from a remote computing node, a request for a new non-fungible token ("KNFT") wherein the KNFT comprises a unique KNFT identifier, at least one metadata element, and least one social vector. A blockchain proxy server may be operatively connected to the KNFT application server and to a distributed blockchain ledger, and be to: (a) record the unique KNFT identifier on a new transaction block with the distributed blockchain ledger; (b) receive a blockchain address and verification that the new transaction block has been recorded; and (c) monitor the blockchain and, for any transaction on the blockchain matching the blockchain address, read a transaction metadata element from the transaction data. In embodiments of the invention, a KNFT API server may be operatively connected to the KNFT application server, and programmed to: (a) write the KNFT identifier to a KNFT index; (b) receive a blockchain address from the blockchain proxy server identifying the new KNFT the blockchain proxy server to record, on a new transaction block with the distributed block; (c) store, on a data store comprising physical, non-transient, electronic storage media, at least one metadata component associated with the KNFT, and link the same to the KNFT index; (d) track engagement with the KNFT by scanning at least one public social media feed for any social action referencing the blockchain address and updating the social vector to reflect the reference.

In embodiments of the invention, a method is disclosed for creating actional digital assets and tokens incorporating influence and outreach. A KNFT application server may be utilized to receive, over a distributed computing network from a remote computing node, a request for a new non-fungible token ("KNFT") wherein the KNFT comprises a unique KNFT identifier, at least one metadata element, and least one social vector. A blockchain proxy server may be operatively connected to the KNFT application server and to a distributed blockchain ledger, and be utilized to: (a) record the unique KNFT identifier on a new transaction block with the distributed blockchain ledger; (b) receive a blockchain address and verification that the new transaction block has been recorded; and (c) monitor the blockchain and, for any transaction on the blockchain matching the blockchain address, read a transaction metadata element from the transaction data. In embodiments of the invention, a KNFT API server may be operatively connected to the KNFT application server, and utilized to: (a)write the KNFT identifier to a KNFT index; (b) receive a blockchain address from the blockchain proxy server identifying the new KNFT the blockchain proxy server to record, on a new transaction block with the distributed block; (c) store, on a data store comprising physical, non-transient, electronic storage media, at least one metadata component associated with the KNFT, and link the same to the KNFT index; (d) track engagement with the KNFT by scanning at least one public social media feed for any social action referencing the blockchain address and updating the social vector to reflect the reference.

In further embodiments of the invention, the social action may comprise any of: user comment, connection, direct message, like, or favorable rating. In further embodiments, a change in ownership of the KNFT may be written to the social vector by the KNFT API. In still further embodiments, the social vector may comprise social vector data from at least one prior owner. In further embodiments, the KNFT may further comprise a circulation trail vector that incorporates the ownership history of the KNFT. In further embodiments, the social vector may comprise a metric representing a count of number of circulations of the KNFT. In further embodiments, the social vector may comprise a metric representing a score and points related to the influence and outreach of the owner. In further embodiments, the data store may comprises a cloud storage system or a peer-to-peer distributed storage system. In further embodiments, the blockchain may be interoperable with any of the Stellar, Ethereum, Loom, POA, or Kaleido networks. In further embodiments, the KNFT metadata element may be one of: token template, name, type, layout, action type, media, color, pattern, batch size, and delivery effect. In further embodiments, the ownership of a KNFT may be shared amongst a number of users, each user having a corresponding voting right to take actions on the KNFT. In still further embodiments, the KNFT may further comprise a DNS and ENSp reference to an interne domain, enabling the holder to manage the DNS and ENS settings for the domain.

DETAILED DESCRIPTION

In embodiments of the invention, a KNFT may be a non-fungible collectible digital asset that can derive social value from the person, moment or brand it represents, its circulation trail, or the social capital that comes with holding, trading or gifting the KNFT. In a preferred embodiment, a KNFT may contain the following elements:

(1) KNFT Template—The default KNFT template represents a coin, though KNFTs may also take the form of collector cards, coupons, bottle tops, or unframed digital assets, among many other formats. Minted KNFT assets may be compatible with NFT (non-fungible tokens) digital exchanges such as OpenSea, Rare Bits and 0x Exchanges.

(2) Media—In embodiments of the invention, the KNFT is an NFT that has been customized through images, GIFs, videos, audio, and the like associated with the KNFT.

(3) Social Actions—An engagement protocol may enhance the value of the KNFT by tracking the individual KNFT's transfer path among users, and adding social actions to the digital asset such as commenting, connecting, and direct messaging, among others.

The real-world or market value of the KNFT may be a function of other digital assets associated with the KNFT, the creator's influence and its social actions.

Social actions may include various types of engagement with the KNFT, including commenting on the KNFT, connecting with current and previous holders of the KNFT, and the KNFT's media, among others. For example, a social value of the KNFT may incorporate the number or value of comments made on the token, the number of likes or favorable ratings, the number of connections, and the circulation trail, among others. The media value of the KNFT may incorporate the token name, as well as the associated media.

A platform is described for rapidly creating actionable digital assets and tokens on the blockchain with influence and outreach that include social actions, redemption actions, and royalty distribution.

The KNFT "platform" includes KNFTs, users of those KNFTs, KNFT channels and applications, blockchain and other integrations. An "application" may refer to software that performs a specific function for a user, or another application. A block diagram of an exemplary KNFT platform is shown in FIG. 1

Figure 2:
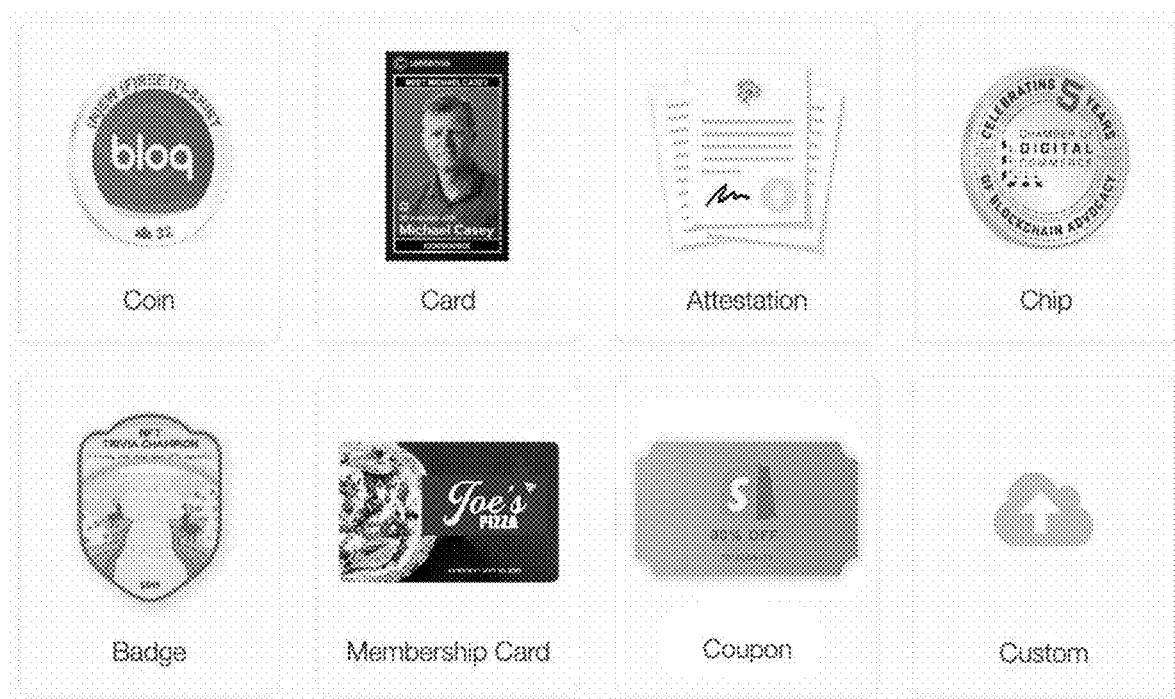
FIG. 2 depicts a variety of exemplary KNFT template forms, according to aspects of the present disclosure.

KNFTs can exist in multiple template forms, as shown in FIG. 2.

Figure 3:
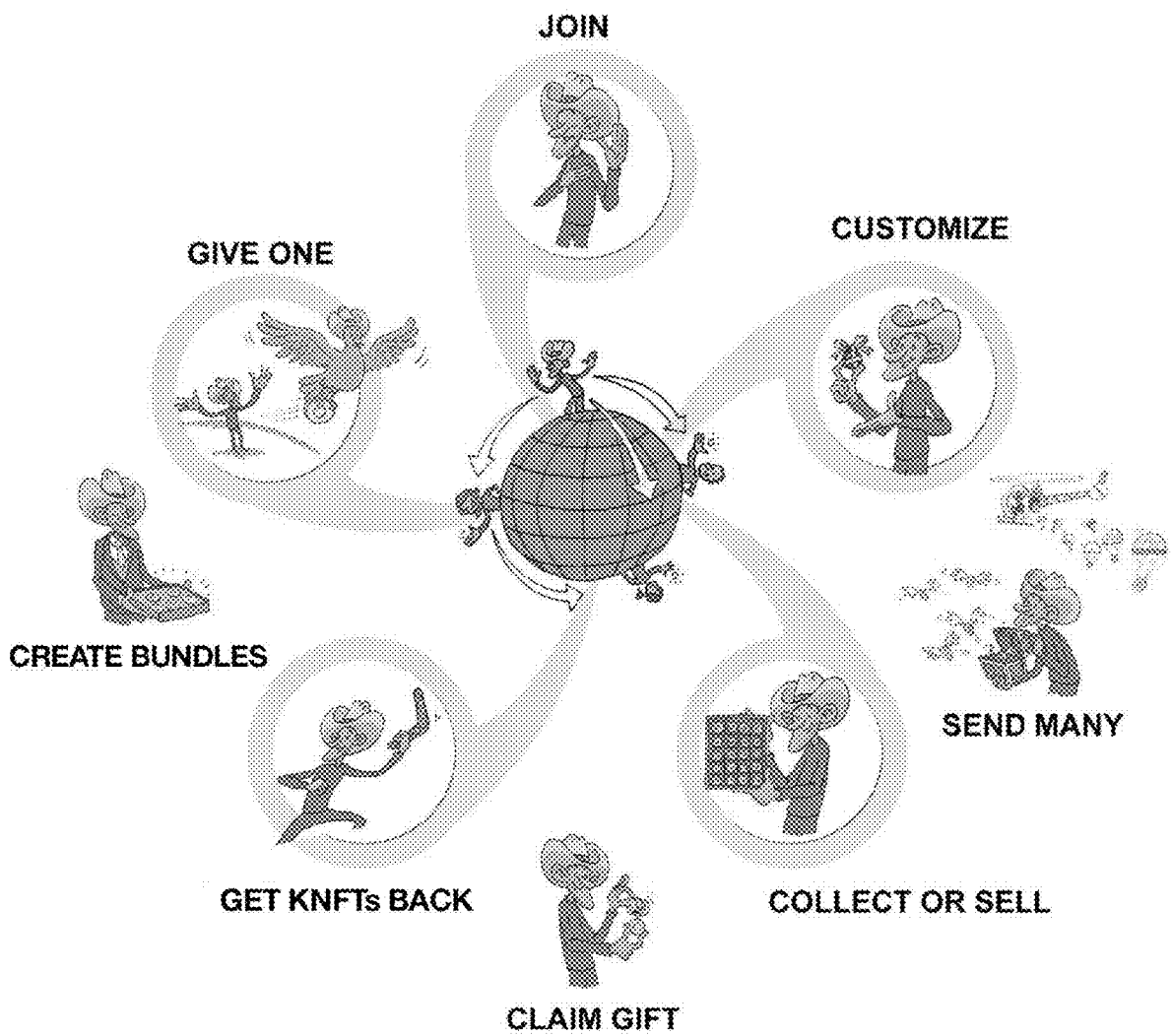
FIG. 3 depicts a variety of exemplary actions to be used with KNFTs, according to aspects of the present disclosure.

Different actions may be taken with the KNFT, or on the KNFT, including customization, gifting, and collecting, among others. Some of the available actions associated with a KNFT are shown in FIG. 3.

Figure 4:
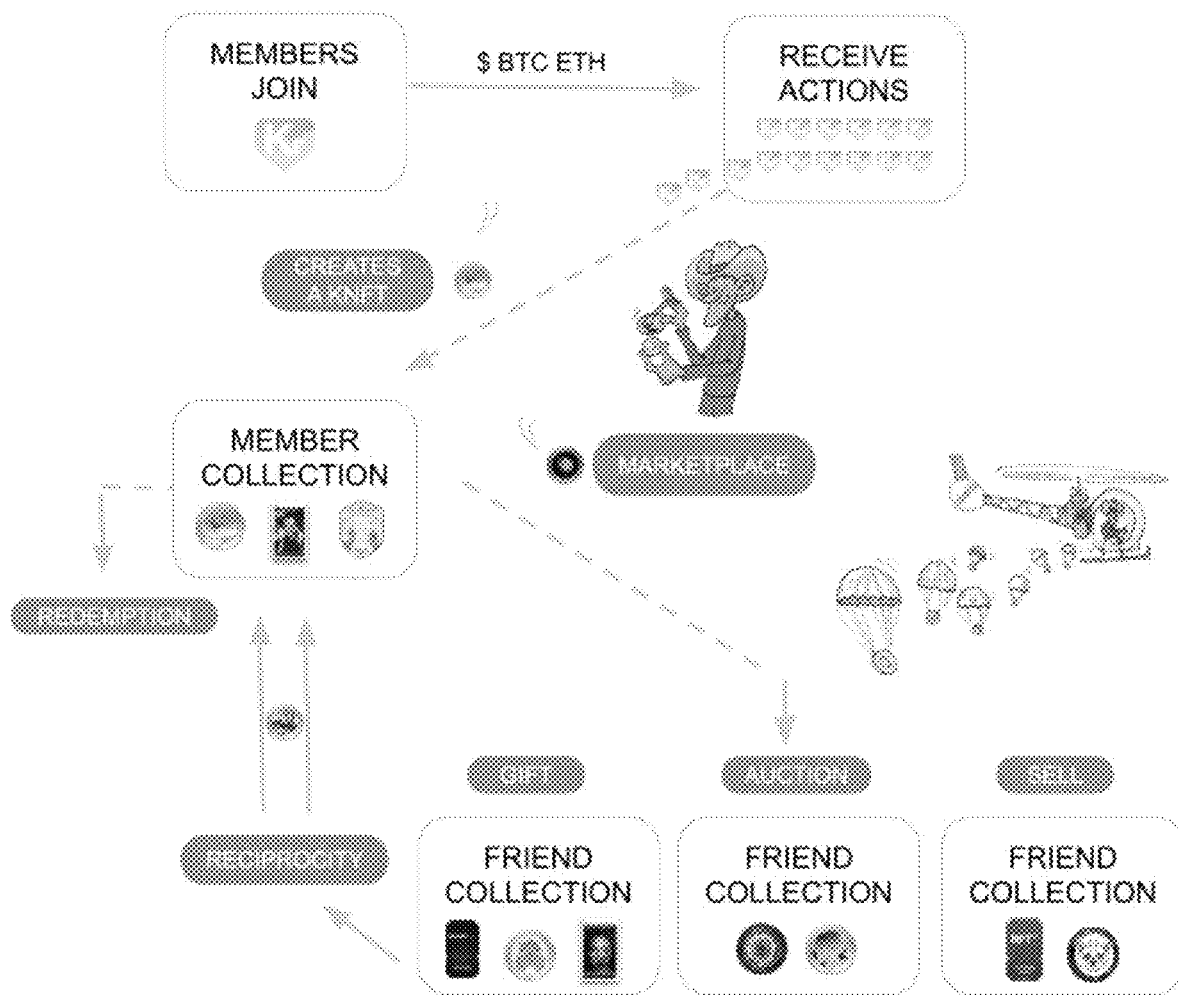
FIG. 4 depicts an exemplary KNFT platform use, according to aspects of the present disclosure.

An overview of an exemplary KNFT platform use is shown in FIG. 4.

KNFT Platform Channels

Elements of the platform may be customized or whitelabeled to provide a consistent brand experience for corporate users who make KNFTs available to their customers. For example, a clothing company may implement a KNFT platform and design a registration application using the brand's color scheme, logo, media, and even domain names, to market KNFTs to its own customers. The KNFT platform implementation could be performed by the clothing brand itself, or by an outside vendor offering KNFT platform implementation as a service.

Specific KNFT platform channels may be created for a unique domain address with configurable attributes:

| | |
|---|---|
| (1) | Page Styles |
| (2) | Logos |
| (3) | Feature color |
| (4) | Show/hide marketplace |
| (5) | Show/hide newsfeed |
| (6) | Show/hide KNFT create action |
| (7) | Show/hide KNFT give action |
| (8) | Show/hide KNFT request action |
| (9) | KNFT layouts |
| (10) | KNFT types |
| (11) | Filters |

KNFT Creation

A KNFT may be created on a selected blockchain network such as the Ethereum network or an Ethereum sidechain such as Loom or POA, or on the Stellar network, with metadata and media files stored on the InterPlanetary File System ("IPFS").

KNFT metadata—including the design of individual KNFTs and the messages attached to them—is available via the KNFT cloud datastore using the address or memo ID from the selected blockchain network combined with IPFS. The KNFT endpoint accepts the memo value and returns full details of the KNFT, and the messages endpoint allows viewing the messages posted to the KNFT. In embodiments, cloud data may be instead stored on the blockchain. The cloud datastore contains public details such as the usernames and avatars, messages, likes, and images attached to KNFT.

KNFT Registration and Customization

In embodiments registration may be required for users to generate and interact with KNFTs. An exemplary registration portal may take the form of a web application (e.g., www.app.nft.kred). The level of user information and verification required may vary with jurisdiction and application and will generally include: (1) a unique email address; (2) a unique user ID; (3) mobile telephone number for verification; and (4) an identity check in certain US states and some countries. In embodiments, identity verification may be required to export KNFTs into a digital wallet. The username may be used to create a profile domain where other users may send KNFTs. Any KNFTs sent to the profile domain are added to the user's online wallet after the user accepts the transfer.

Figure 5:
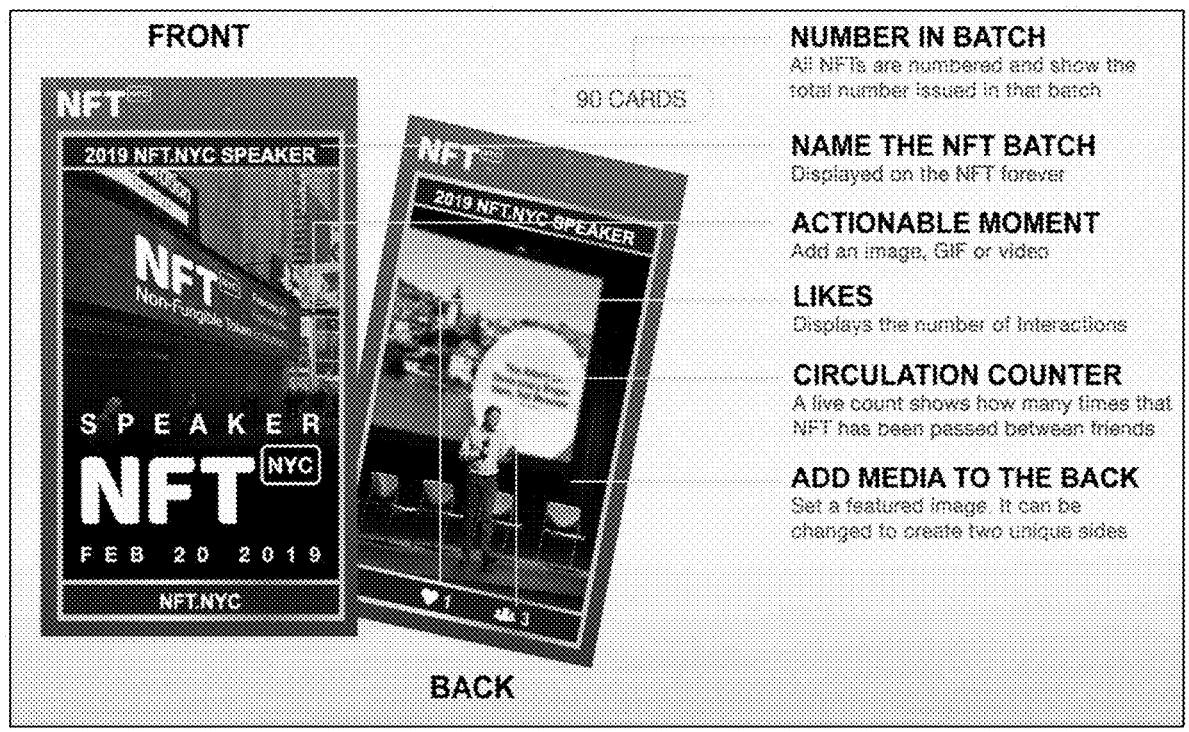
FIG. 5 depicts an exemplary slate of customizations for a KNFT card, according to aspects of the present disclosure.

At the time of KNFT creation the user may add a design to the front and back of the Token and add other customizations. FIG. 5 shows an exemplary slate of customizations for a KNFT card. Here, the user has elected to issue a KNFT card to communicate he's a Speaker at an Event.

Customizations may include the name of the KNFT, which name is preferably associated with the KNFT in perpetuity. As shown in FIG. 5, the "2019 NFT.NYC SPEAKER" name reflects the purpose of the card issued, though such a descriptive title is not required. The customization may include a "moment" that shows the individual accomplishment or action and can be in the form of any media such as a photograph, image, GIF, or video.

In embodiments, a circulation counter may be included to show a live count of how many times that individual KNFT has been exchanged among unique KNFT holders such as friends. As everyone who has owned the KNFT may connect with each other, a high circulation may increase the social value of the KNFT.

The issuer of the KNFT may also be displayed. As KNFTs may be generated in batches, the number of the KNFT in the particular batch may also be graphically displayed. In embodiments, a unique URL may be associated with the KNFT, which carries its issuer's profile as a verification of who created it.

KNFT Attributes

In embodiments, KNFTs generated according to the present invention may embody various attributes defined by platform administrators and stored with the data on the blockchain.
Examples include:

(1) Token Template: Pre-defines a KNFT's appearance for quick and easy minting. Some examples are: Coin, Chip, Ticket, Card, Badge, Custom, Book, Attestation, Membership, or Redemption Coupon.

(2) Name: Reflects the purpose of the KNFT as described by the user.

(3) Type: The token type, controlling its function, could be a Digital Collectible, Business Cards, Membership Card, Meetup Token, Author Token, Discount Token, NFT Download, Achievement, NFT Ticket, Attestation, Reward Badge, Meet VIPs Token, NFT Coupon, Flash Group Token, Data Consent Token, Asset Registration Token, Instant Podcast Token or a Tracking Token.

(4) Layout: The token layout, controlling the color or branding scheme (5) Action Type: There are 2 Types of Actions that can be taken. Social Actions, which includes: Give, Trade, Comment, Like, Share, Request, Connect or Redeem; and Premium Actions, which includes: Minting a Token and Moving a Token to Ethereum.

(6) Front Media: The graphical face of the KNFT, showcasing an achievement, avatar, logo, favorite meme, or the like.

(7) Back Media: The graphical rear of the KNFT and may be set to default to the same graphical image and the front, the user's ID, or the like.

(8) Color: Every batch may have its own unique color.

(9) Pattern: Users may be given the option to choose a repeating pattern for the KNFT, and customize its color.

(10) Batch Size: The number of KNFTs released in the batch.

(11) Delivery Effect: An animation displayed when the recipient receives the KNFT such as, for example, grow, rotate, throb, spin, wink, or unfold.

The provenance of the KNFT may also be recorded with the KNFT's data on the blockchain. As the KNFT touches people and travels, it gathers their feedback, wisdom and comments. Other people may want to acquire the KNFT to connect to its circulation trail.

In embodiments, various types of users exist and are a function of this activity and engagement. Examples may include:

| | |
|---|---|
| (1) | Newbie. A New member |
| (2) | Issuer. Customizes and issues new KNFT |
| (3) | Owner. A member with a KNFT currently in their collection |
| (4) | Holder. A member who receives and holds KNFT |
| (5) | Collector. A member who buys or receives KNFT without passing them |
| (6) | Trader. Swaps collectible KNFT with others. |
| (7) | Giver. A member who regularly passes KNFT on |
| (8) | Leader. Top KNFT displayed on Leaderboards |

Comments, Engagement and Ownership

In addition to the visual customizations, each KNFT may have its own thread of comments, which owners of that KNFT may add to or comment on while they hold the KNFT or when they pass it on. In embodiments, past holders of the KNFT may maintain their access to comments and can view the KNFT's past and future owners. It will be appreciated by those of ordinary skill in the art that all attributes associated with the KNFT, including the comments, may be stored securely and permanently on the blockchain.

An engagement protocol may enhance the value of the KNFT by tracking the individual KNFT's transfer path among users, and adding social actions such as commenting, connecting, and direct messaging, among others.

The more people who share the KNFT, the more connections that everyone in the user's community may make. The KNFT asset is thus more than just a number in the user's wallet, but instead give the user the power to share a message or mission, and connect with others.

Depending on the type of KNFT, recipients will either want to keep the KNFT as a memento, redeem it, sell it, or pass it on.

In embodiments the ownership of a KNFT may be shared amongst a number of users, each user having a corresponding voting right to take actions on the KNFT, such as a sale, transfer, customization, and so on.

In embodiments, each KNFT may act as a social action vector, which may have a corresponding function in conventional social media networks. These vectors travel with the KNFT and impact its value and while having some attributes in common with traditional social networks (e.g., liking a social media post may be considered similar to minting and giving a coin) the data is decentralized and outside the ownership of any one social media network.

KNFT Market Value

The value of a particular KNFT may fluctuate over time. The market price for an individual KNFT may be based on:

(1) Social Value: The KNFT creator, the length of the social trail (and thus the number of available interactions) and the people on that social trail (influencers and celebrities might cause an increase in value, for example), may impact the market value of the KNFT. The commentary and number of likes also contribute to the social value of the KNFT.

(2) Media Value: The KNFT name and media associated with the KNFT may impact the value. For example, a well-known artist who creates a limited run of KNFT digital assets with custom artwork. The value and scarcity of the artwork alone could cause an increase in KNFT value.

(3) Rarity: The rarity of the KNFT (e.g., batch number, and number in the issue).

(4) Redemption Value: The value of the offer, product or service that the owner of the KNFT is entitled to.

Batch Generation and Mesh Functionality

In embodiments, batch functionality may be implemented for generating an identical batch of KNFTs. For example, the KNFT platform may be configured to create a run of identical KNFTs, with an upper limit (e.g., 500) set by platform administrators. The KNFTs in a single batch may be identical, with each KNFT in the batch "meshed together" across the batch. In embodiments, KNFT features such as comments and connections may be global (meshed) across the whole batch.

KNFT Bundles

Figure 6:
FIG. 6 depicts an exemplary KNFT bundle, according to aspects of the present disclosure.

In embodiments, a KNFT Bundle is a group of KNFTs wrapped together, sharing the same address link. FIG. 6 shows one such bundle of eight KNFTs. Users may subscribe or be invited to claim a Bundle. A link is shared via Email or SMS. Users would then sign up to the KNFT Platform and receive their Tokens directly on a free Digital Wallet that is automatically set up.

A Token can be added to a Bundle after the Bundle has been claimed. KNFT has developed a Progressive Delivery Process that drops a new Token into users' wallets. A notification email is also sent to these users to let them know a new KNFT has been delivered.

Scoring the Social Impact of KNFTs

In embodiments of the invention a score may be calculated that represents the social impact of a KNFT, measuring influence and outreach actions associated with the KNFT. Both the owner of the KNFT and the KNFT itself may be scored.

Scoring actions may take place in various contexts:

(1) Within the KNFT's attached news feed (comments, likes, reposts).

(2) They may take place when the KNFT is posted inside social networks. For example a KNFT that redeems for a speaker's time may be included inside a Twitter post that is liked and retweeted.

(3) A scoring action may occur when a KNFT is bought, sold, or traded.

Background: The Kred Score

The Kred Score has been used to assess an individuals' and brands' Influence and Outreach. It is a dual score measure.

The interactions of social media users on a social media site and/or a social network site/blogging site (e.g., Facebook, Twitter, etc.) are tracked by a Kred Scoring system (a collection of computing devices and proxies). Based on these interactions, a score (a Kred Score) may be calculated for the users. The Kred Score provides a way to score users (people and brands) for their influence and outreach (generosity) in the social media realm.

Figure 7:
FIG. 7 depicts a Kred Score badge, showing influence and outreach metrics, according to aspects of the present disclosure.

Kred Scores may reflect Trust and Generosity, the foundations of strong relationships. Icons or other visual indicators, such as Kred badges, may be used to show Influence Scores on the upper left and Outreach Levels, as shown in FIG. 7.

Background: Influence and The Kred Scoring System

In embodiments of the invention, Kred Influence may measure what others do because of the user's actions. A user's Influence score may increase when someone takes an action because of the user's content on Twitter or any other network they have connected to their Kred profile.

Influence Points may be received every time people interact directly with the user or the user's content. Influence Points may be added together and translated to the user's Kred Influence Score, which ranges from 1 to 1,000. Higher scores represent greater influence. Since Kred Influence is normalized, the rate at which Influence Points convert to Kred Influence constantly changes as everyone in the social universe accrues Points.

Figure 8:
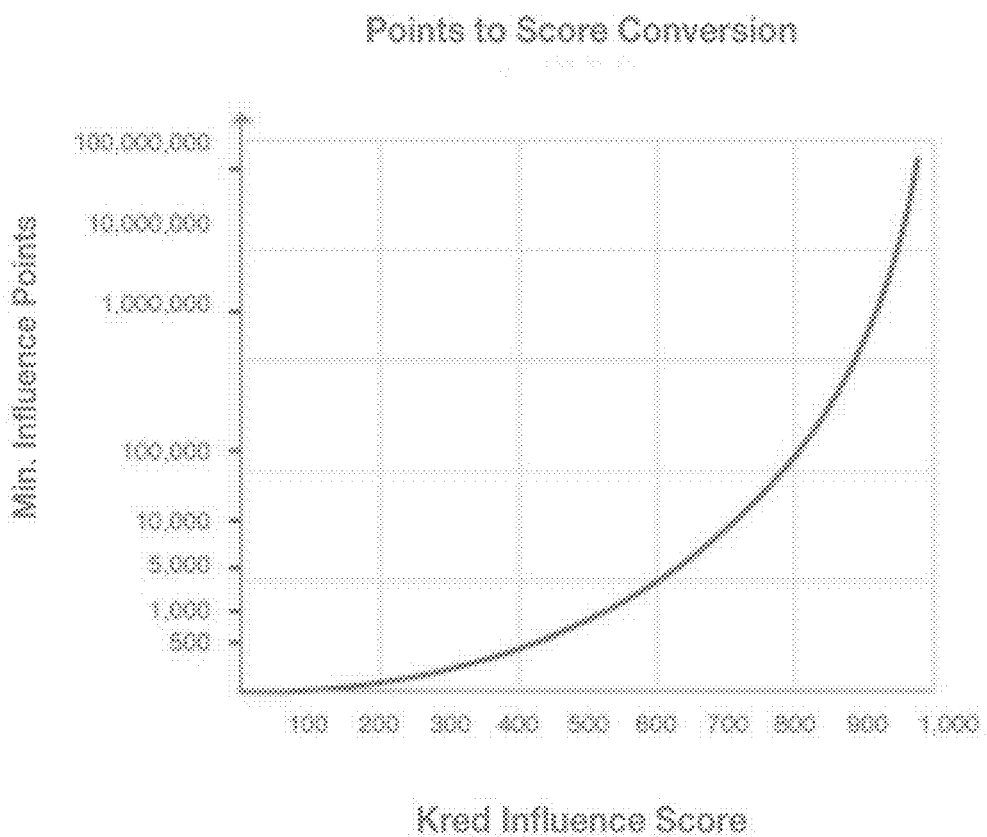
FIG. 8 is graph illustrating the relationship between influence points and score, according to aspects of the present disclosure.

The Points To Score Conversion curve shown in FIG. 8 grows steeper as Kred Influence Score grows. The higher the user's Kred Influence, the more points it may take to move up.

Figures 9, 10:
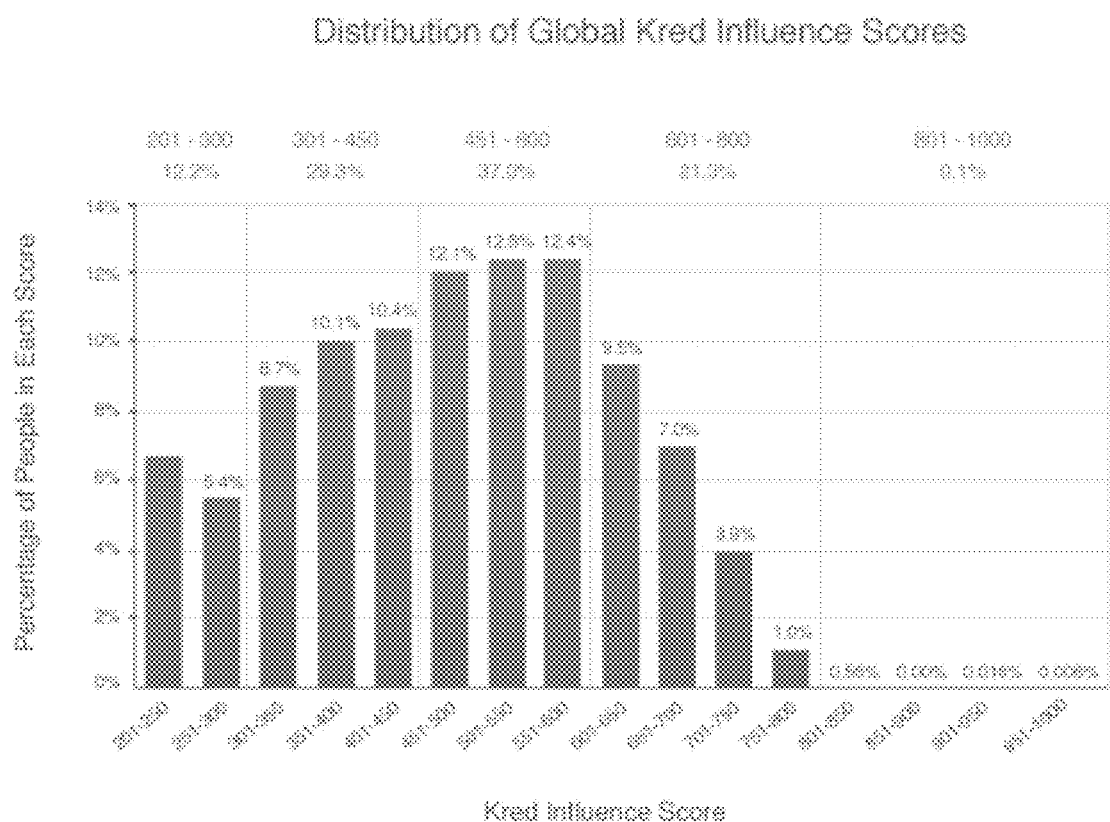
FIG. 9 illustrates a sample distribution of global Kred influence scores.
FIG. 10 depicts a sample conversion between Outreach Points and Outreach Level, according to aspects of the present disclosure.

FIG. 9 illustrates a sample distribution of global Kred influence scores.

Background: Kred Outreach

Outreach (Kred Outreach) may measure a user's generosity. Outreach may occur when a user retweets, @reply, or follows a new person on Twitter or mentions, likes, or comments on someone on Facebook (or other social network). As the user accumulates Outreach Points, the user may move to a higher Outreach Level. A user's Outreach Points accumulate to increase the user's Outreach Level. FIG. 10 depicts a sample conversion between Outreach Points and Outreach Level.

KNFT Points and Scoring

In embodiments of the invention, KNFT social actions may create KNFT points, which points may accumulate in the KNFT Points Token. FIG. 11 illustrates an exemplary KNFT points table.

KNFT Points Token

In embodiments of the invention, a Points Token is an ERC721 token defined by a custom contract that tracks and scores activity relating to a specific KNFT (or any third-party ERC721 token). As transactions take place on the blockchain, the scoring mechanism automatically creates and updates Points Tokens for every KNFT (and tracked third-party NFT). KNFT social actions are also tracked by the Points Token.

Figure 12:
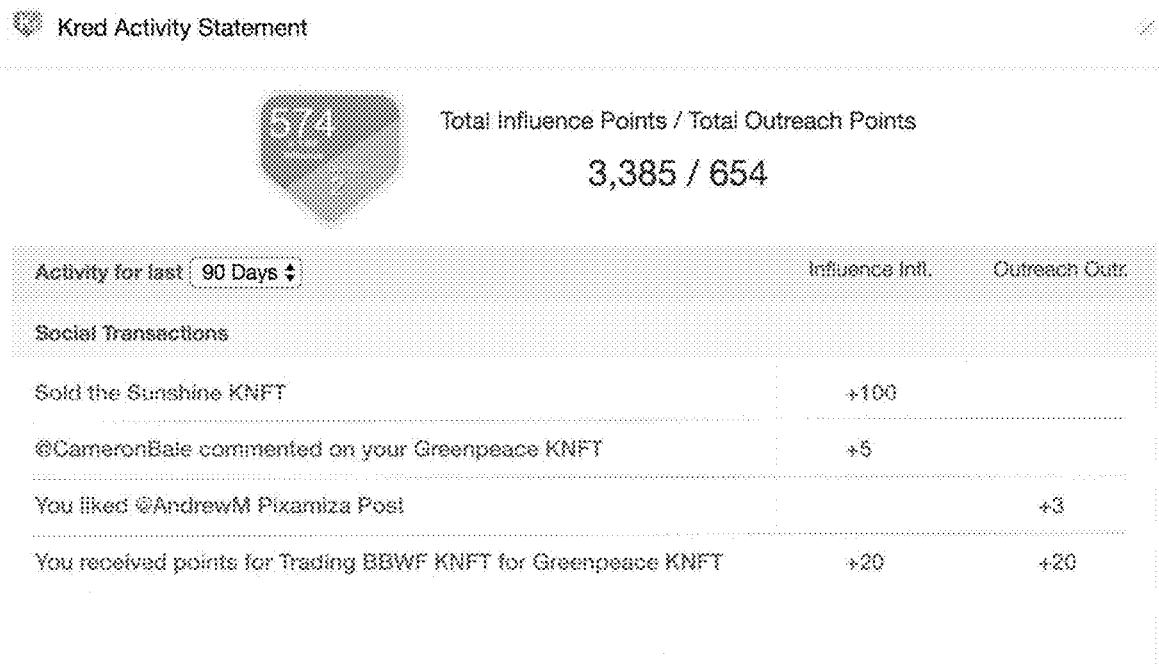
FIG. 12 depicts a sample influence and outreach activity statement, according to aspects of the present disclosure.

KNFT influence and outreach activity may be tracked and provided to users in the form of the statement illustrated in FIG. 12.

Scoring KNFT Owners

Points accrued by each KNFT may also accrue to the current owner, identified by the blockchain wallet holding the KNFT.

Scoring KNFT Bundles

In addition to Points Tokens for individual KNFTs (and third-party NFTs), the Kred scoring system can create and update Aggregate Points Tokens based on the data and metadata properties of the individual KNFTs being tracked.

When a KNFT or batch of KNFTs is submitted as part of a bundle, the points for those KNFTs are automatically aggregated into the Points Token for the bundle as a whole.

Scoring Decentralized Applications Using KNFTs

A DAPP refers to a decentralized application, typically running on a decentralized computing system. Each DAPP, operating on one or more blockchains, may be defined by a set of contracts in the form of application code that runs on the blockchain itself and specifies the functions and properties of the NFTs belonging to the DAPP. Each contract may be automatically assigned an Aggregate Points Token that accumulates the points of all NFTs issued by that contract. The points for any given DAPP may thus be the sum of the Aggregate Points of the contracts owned by that DAPP.

Scoring: Processing KNFT Metadata

Each social action posted via the KNFT API may be attached to a specific KNFT (or third-party NFT). These actions are immediately scored against the corresponding NFT, with the Points Token keeping track of the latest action applied to ensure that no double-counting occurs.

Scoring: Scanning the Blockchain

Each blockchain publishes a live feed of blocks as they are validated by the consensus mechanism and the transactions committed to the ledger. These blocks contain a list of confirmed transactions, including simple value transfers, fungible tokens, and NFT operations.

The ERC721 standard specifies a mechanism for fetching the metadata for any arbitrary NFT. When an NFT transaction is published to the blockchain, the Kred tracking mechanism also reads the current ERC721 metadata at the specified URI.

Scanning Public Social Feeds

The Kred scoring mechanism also follows publicly available social feeds for identifiable blockchain addresses. When an address matches a KNFT or known NFT, the corresponding Points Token is automatically updated.

KNFTs and the Blockchain

In embodiments, the KNFT platform is a hybrid platform using traditional open database storage (such as Amazon Web Services) and processing, and blockchain platforms.

In embodiments, KNFT transactions may be recorded on the selected blockchain ledger—either the Stellar blockchain, or the Ethereum blockchain or compatible sidechains or private networks such as Loom, POA, or Kaleido—depending on the channel creator's recording preference.

A KNFT is created on the selected blockchain network when KNFT metadata and media files stored on InterPlanetary File System (IPFS). KNFTs may be gifted immediately using Ethereum sidechains or the Stellar network, with no Ethereum or ledger transaction fees until the owner of the KNFT—whether the user or a future buyer—decides to sell.

KNFT Data and Functionality

In embodiments of the invention, a KNFT may comprise code, data, and metadata, deployed to a blockchain and to distributed storage and servers depending on the capability of the blockchain used for a given KNFT.

In the case of a blockchain that does not support programmable transactions, such as Stellar, the KNFT may be defined on-blockchain by an asset type and a token identifier, which is a unique hash based on the invariant properties of the KNFT and generated using the standard SHA-256 algorithm. In this case since Stellar has no viable mechanism for encoding arbitrary data, both the KNFT data and metadata may be stored off the blockchain in IPFS or other distributed storage mechanisms, also identified by the unique token hash.

In the case of a blockchain that does support programmable transactions, including Ethereum, Ethereum-compatible blockchains such as PoA and Loom, or Facebook's Libra, the data and functionality of the KNFT may be defined directly on the blockchain by a "contract," a computer program that is compiled and published to and subsequently executed on the blockchain itself. In this case, the invariant defining characteristics of the KNFT, including its token identifier, batch and sequence numbers, type, name, and symbol, may be written directly to the blockchain when the KNFT is created by the contract in a process called "minting." This process may be initiated by any wallet on the blockchain that is authorized in the published contract. The security mechanism for minting relies on the security of the authorized wallets themselves.

In addition to the invariant data that is stored on the blockchain network, a token may also have metadata that is stored off the blockchain, in a database or file system such as IPFS. This metadata is not limited by the capacity of the blockchain or by transaction costs, and can therefore be more expansive and detailed, and also can be updated to reflect activity involving the KNFT.

For interoperability purposes this metadata follows the standards specified by the Ethereum project under ERC721 and ERC1155 regardless of the network actually use for a given KNFT. For example, tokens created on the Stellar network have ERC721-compliant metadata that does not need to change when the tokens are transferred to or from other blockchain networks.

The contract may also implement data attributes and functions unique to a specific KNFT type. The ERC721 token standard defines only a minting function for creating tokens, with additional attributes assigned to off-blockchain metadata, but this limits the scope of smart contracts—programs that run directly on the blockchain and act upon the tokens created by other contracts.

Smart contracts are limited in scope to only acting on data stored on the blockchain itself, unlike external applications which can read both the blockchain and metadata. By extending the data attributes in the contract, for example, by adding a redemption timestamp to the contract for Redeemable KNFTs, a smart contract can confirm when and whether a KNFT has been redeemed, and, with appropriate authorization delegated by the defining contract, mark it as redeemed and provide in exchange some other on-blockchain transaction or asset.

KNFT Systems and Workflow

Figure 13:
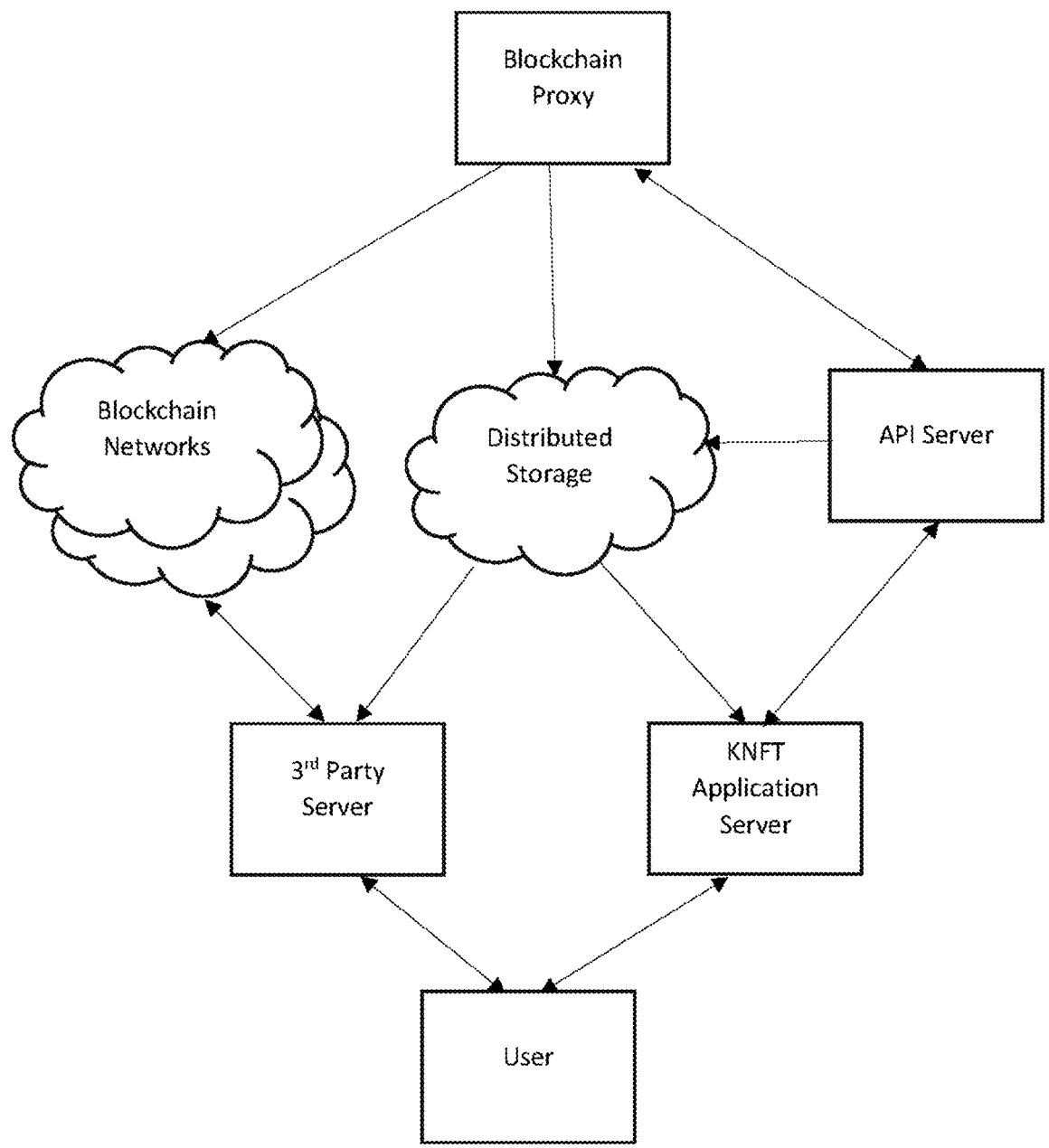
FIG. 13 illustrates an exemplary layout for a system according to embodiments of the present invention, incorporating a KNFT Application Server, API Server, and Blockchain Proxy, among other components.
Figure 14:
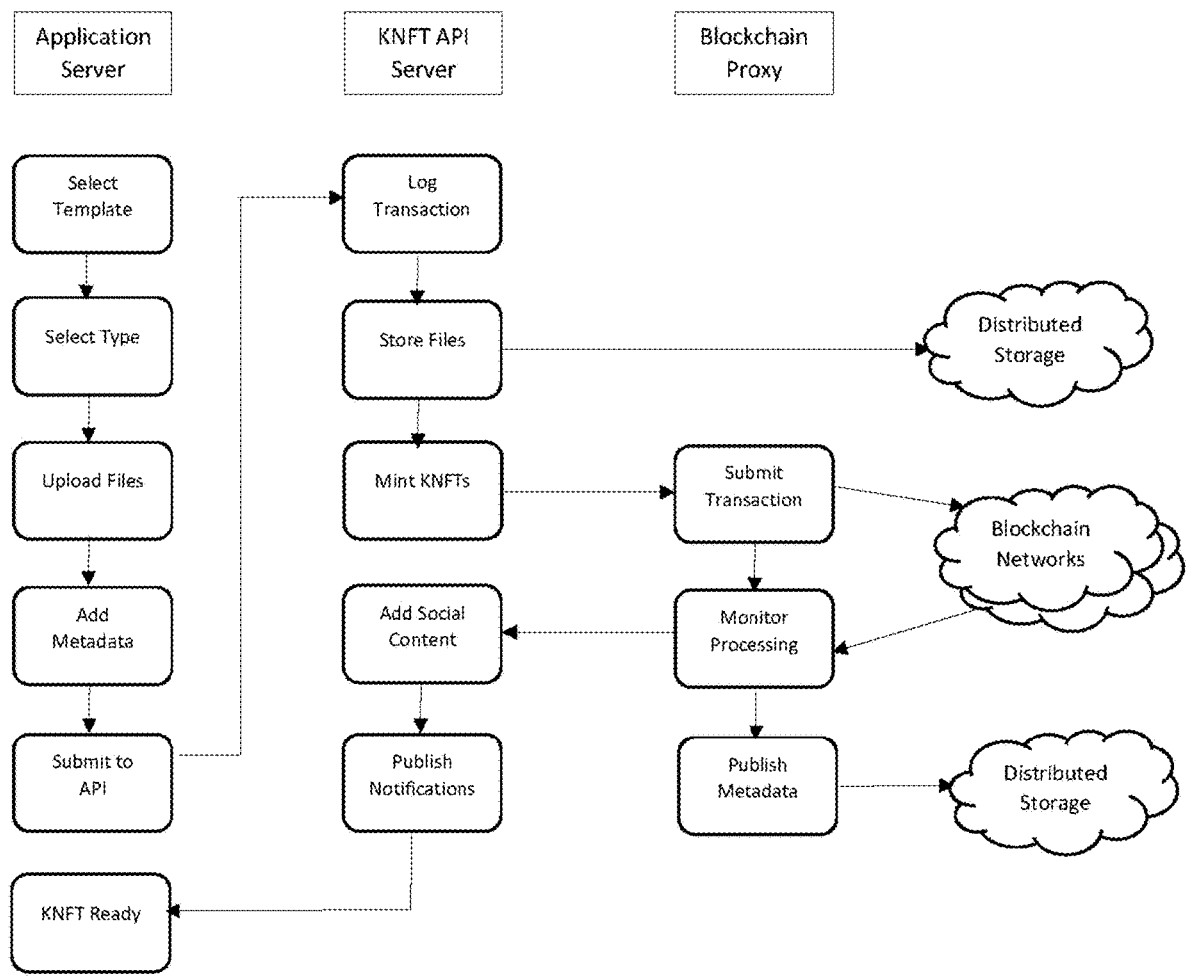
FIG. 14 illustrates the steps in creating and managing a KNFT, according to aspects of the present disclosure.

FIG. 13 illustrates an exemplary layout for a system according to embodiments of the present invention, incorporating a KNFT Application Server, API Server, and Blockchain Proxy, among other components. FIG. 14 illustrates the steps in creating and managing a KNFT according to embodiments of the invention.

When creating a KNFT, the user may access a KNFT Application Server, which is responsible for presenting the user interface. The application server preferably does not maintain data or connect directly to the blockchain or to cloud storage, relying on the KNFT API for these functions. The role of the application server is to maintain the process flow for users creating, selling, and trading KNFTs, and to prepare transactions to be submitted to the KNFT API Server.

The KNFT API Server may perform multiple roles. It connects to the databases that index KNFT data and metadata for rapid retrieval; it integrates social transactions on KNFTs with the SocialOS platform; it standardizes the format of KNFT metadata both for direct access and for publishing via a distributed storage mechanism; it transfers uploaded user content to cloud storage and in distributed storage; and it interfaces to the Blockchain Proxy for operations directly on the KNFTs themselves. The KNFT API Server provides the public API for all first-party and third-party KNFT apps.

The Blockchain Proxy may provide an internal, private interface that abstracts the differences between blockchains and provides a single unified mechanism for the API Server. It supports transactions on Stellar and on any Ethereum-compatible blockchain network and has a modular architecture to adapt to future blockchain designs so long as they meet minimum standards of programmability and ACID (atomic, consistent, isolated, and durable) compliance.

The Blockchain Proxy also handles processing for third-party software architecture built on existing blockchain networks; this includes the 0x project for selling and trading NFTs, and the ENS project for managing ownership and properties of internet domain names as digital assets on the blockchain.

The Blockchain Proxy also manages VPN (virtual private network) connections and authorizations for each public or private blockchain network, and for each wallet that is used on each network for activities requiring authentication, including publishing new contracts, minting and delivering KNFTs, and managing domain tokens.

Each of these three logical servers may be implemented as an independent virtual cloud server so that they can be instantly replicated for reliability and scaled to sustain performance guarantees as transaction volumes grow.

KNFT Blockchain Bridge

When a user wishes to move their KNFT to the Ethereum network an ERC721 (or ERC1155) token is created and the IPFS metadata is moved to the ERC721 (or ERC1155) token. The media files remain on IPFS.

Users choosing the alternate network may incur charges related to the computational effort that it will take to execute the transfer. These execution fee charges for operations made on the Ethereum blockchain are commonly known as gas.

The Ethereum blockchain network provides the complete set of features needed for NFT applications: It is programmable, transactional, and fully distributed. It is unfortunately also at times expensive, slow, and in cases of high congestion, unreliable-transactions may be issued but simply never make their way to the blockchain.

For this reason any application intended to work with NFTs at scale needs to support at least one of several options:

An Ethereum-compatible network implementing its own bridge to the Ethereum mainnet, such as POA and Loom. These networks are faster and cheaper than Ethereum with the penalty that they are not fully distributed. The contract code interacts with the bridge on each network to automate the transfer of KNFT to and from the Ethereum mainnet.

An Ethereum-compatible private network, with a private bridge to the Ethereum mainnet. In this case the application has full control over the blockchain, which means that a standard ERC721 (or ERC1155) contract can be used. When transferring a KNFT from one network to the other, the application stores the KNFT in a specific holding wallet, and either mints or releases the matching KNFT on the other network.

A simpler alternate blockchain such as Stellar, with off-blockchain storage of NFT metadata. Stellar provides simple transactional functionality that is cheap and fast, with transactions costing a small fraction of a cent and consistently taking less than ten seconds to complete. However, Stellar provides only limited facilities for smart transactions and for storing data on the blockchain, and needs to be combined with a storage mechanism such as IPFS to represent an NFT.

To transfer from Stellar to Ethereum, a transaction is written to Stellar marking that the KNFT has been moved into the holding wallet, and a KNFT minted on Ethereum using the matching KNFT ID combined with off-chain metadata.

Transfers

Each of the mentioned blockchains are entirely separate entities, and a KNFT cannot truly leave any network. The data created for a KNFT is always part of the history of that blockchain.

So the process of transferring KNFTs is one of careful, auditable bookkeeping. The requirements are:

(1) No KNFT can be lost—the transfer from one network to the other should succeed fully or fail such that all changes are reverted.

(2) No KNFT can be duplicated—if a KNFT is transferred to another network, it is no longer available on the original network.

(3) Transactions are verifiable. Any third party should be able to inspect the respective blockchains and come to the same conclusion as to the ownership of any KNFT.

Bridge: The Simple Case

In the primary use case, KNFTs are initially created in blockchain wallets that are delegated to the application. Advanced users who wish to hold KNFT in their personal wallet (such as Metamask) or trade on exchanges such as Rarebits or OpenSea, or decentralized networks such as 0x, would need to first transfer their KNFTs to Ethereum.

The simplest way to handle this is using a conventional database as the coordination mechanism, while performing a two-phase commit transaction on the respective blockchains.

This is what the bridge mechanisms on Loom and POA provide. For Stellar, and for private Ethereum networks, this protocol needs to be implemented within the application.

Bridge: Simple Flow Example (1) An annotation is made in the database and on IPFS that the specified KNFT is to be transferred from the originating wallet to the target Ethereum wallet.

(2) A transaction is opened on the database and on the source network simultaneously to move the KNFT to a designated holding wallet. KNFTs in the holding wallet are unavailable to users or to normal application transactions.

On Stellar, the transaction ID contains the KNFT's unique identifying hash.

On Ethereum-compatible private blockchains the transaction actually transfers the original KNFT to the holding wallet.

(3) When the transaction completes on the source blockchain, the database transaction is automatically committed, and a second annotation is made in the database and published to IPFS.

The application data and IPFS are updated to show that there is a pending transaction on the KNFT and no other operations are possible until it completes.

This stage of the transaction typically takes a matter of seconds, as all the mentioned source networks were selected for speed.

(4) A new annotation is added to the database and published to IPFS showing that the KNFT is being transferred from the holding wallet on Stellar to Ethereum.

(5) A transaction is posted to the KNFT contract to create the KNFT on Ethereum.

(6) The resulting transaction ID is posted to the database and published to IPFS.

(7) At this point, transactions can no longer be processed in lockstep, as the processing times are longer and unpredictable. Instead, the process uses an Ethereum blockchain scanner to monitor the transaction ID for verification of success or failure.

(8) When the scanner sees verification of the transaction, the bridge clears the pending status in the application database, and publishes a final annotation to confirm that the KNFT is now live on the Ethereum network.

Bridge: Failure Modes and Error Handling (1) If an annotation for a pending transaction for the KNFT already exists in the database, the transaction will fail immediately. If the transaction has failed and needs to be retried, it is necessary to wait for confirmation of the failure to be processed through the blockchain scanner and for the database to be updated.

(2) If the transfer to the holding wallet fails on the source blockchain, the database transaction is rolled back, and a failure annotation is made in the database and published to IPFS. (The database annotations are made in an independent transaction and are not rolled back.)

In this unusual case, the bridge can provide immediate feedback to the user via the application or API.

(3) If the bridge process suffers a local server failure during the source processing window it will be left with an annotation of the transaction, and no subsequent annotation.

If there are any such orphan annotations found on recovery, the bridge can verify their status against the source blockchain, and choose to either restart or revert the transaction.

(4) If the bridge process receives a verified failure on the Ethereum transaction, it can retry the transaction automatically. It may be that the Ethereum network was temporarily congested, or that the gas allocated was too low.

In either case, it will create a failure annotation and a retry annotation in the database and IPFS, and wait again on verification in the blockchain scanner.

(5) If the Ethereum transaction cannot be processed in a timely manner—if the Ethereum network is severely congested or gas prices are excessive, as was seen for periods spanning several days in 2018 and again in 2019—the bridge will instead completely unwind the transaction and return the KNFT to the originating wallet.

However, this must wait for confirmation of failure on the Ethereum transaction, which in severely congested conditions may itself take hours. While the transaction is still under way on Ethereum it is not possible to cancel it; it can be overridden with a higher gas fee, but that doesn't help if the gas fee is excessive due to network congestion.

Bridge: More Complex Cases

In this application it is envisaged that a KNFT once transferred to Ethereum for trading will remain on the Ethereum network. However, it is equally possible to transfer the KNFT back to the originating network via a reverse process.

The KNFT is transferred to a smart contract designating the target wallet, and the bridge—which constantly watches the holding wallet—initiates a transaction on the target network to return the previously held KNFT from the holding wallet to the destination user wallet.

This can fail in the following cases:

(1) If the transfer to the smart contract fails, it is handled by Ethereum, with no need for the bridge to intercede. This applies both to Ethereum network failures, and transfers that are rejected by the smart contract, for example, invalid ERC721 KNFTs.

(2) If the destination wallet does not exist on the target network, the bridge instructs the smart contract to return the KNFT to its owner. The smart contract cannot do this itself as it has no visibility into the other network.

If KNFTs are transferred in both directions, they might already exist on the Ethereum network when a transfer is initiated from a secondary network.

In this case, the KNFT will already be held in a smart contract. Rather than using the ERC721 contract to generate the KNFT—which would fail due to uniqueness constraints—the bridge instead instructs the smart contract to release the existing KNFT to the designated Ethereum wallet.

The KNFT Wallet

In embodiments, a wallet on the selected blockchain is automatically created for users at registration for storage of KNFTs and transactions without the need to connect an external wallet.

In embodiments, users may also export minted KNFTs to a compatible external wallet via an adapter built to enable the invention to interact with any web3 enabled blockchain wallet application.

Buying, selling, or sending a KNFT creates a transaction in the selected blockchain peer-to-peer distributed ledger that tracks both the value transferred and the unique token being sent.

In embodiments, users wishing to store their KNFTs offline may do so using a system such as the Ledger Nano S, an offline hardware wallet.

Transferring KNFT

In embodiments, KNFTs may be sent to individuals who are already users of the platform, or are not yet registered users. KNFTs may be sent via messaging (e.g., SMS, WhatsApp, iMessage, Viber, Telegram), e-mail, social media (e.g., direct message through Twitter, Instagram, Facebook, and Snapchat), and other channels. In embodiments, the platform may note which jurisdictions (e.g., U.S. states, foreign countries) prohibit certain types of digital assets and block the user from sending to that jurisdiction.

Figure 15:
FIG. 15 illustrates a scheme for notifying users that they have received a KNFT, according to aspects of the present disclosure.

Recipients may be notified that they have received a KNFT. When a KNFT is sent to someone who has not yet activated their account, the KNFT may be reserved until that person registers, when they can then accept and receive it. In embodiments, an outer limit on the time to claim the KNFT may be imposed and set by administrators or the user. If the KNFT is not accepted within the acceptance window, it may be returned to the person who gave the KNFT. FIG. 15 illustrates such a notification scheme.

In embodiments of the invention, every time a user sends an KNFT, the user may include a public or private message. Public messages may be displayed in the KNFT's comment thread and can be viewed by all past and future KNFT holders. Private messages are delivered to the recipient as an inbox message and can only be seen by them.

Figure 16:
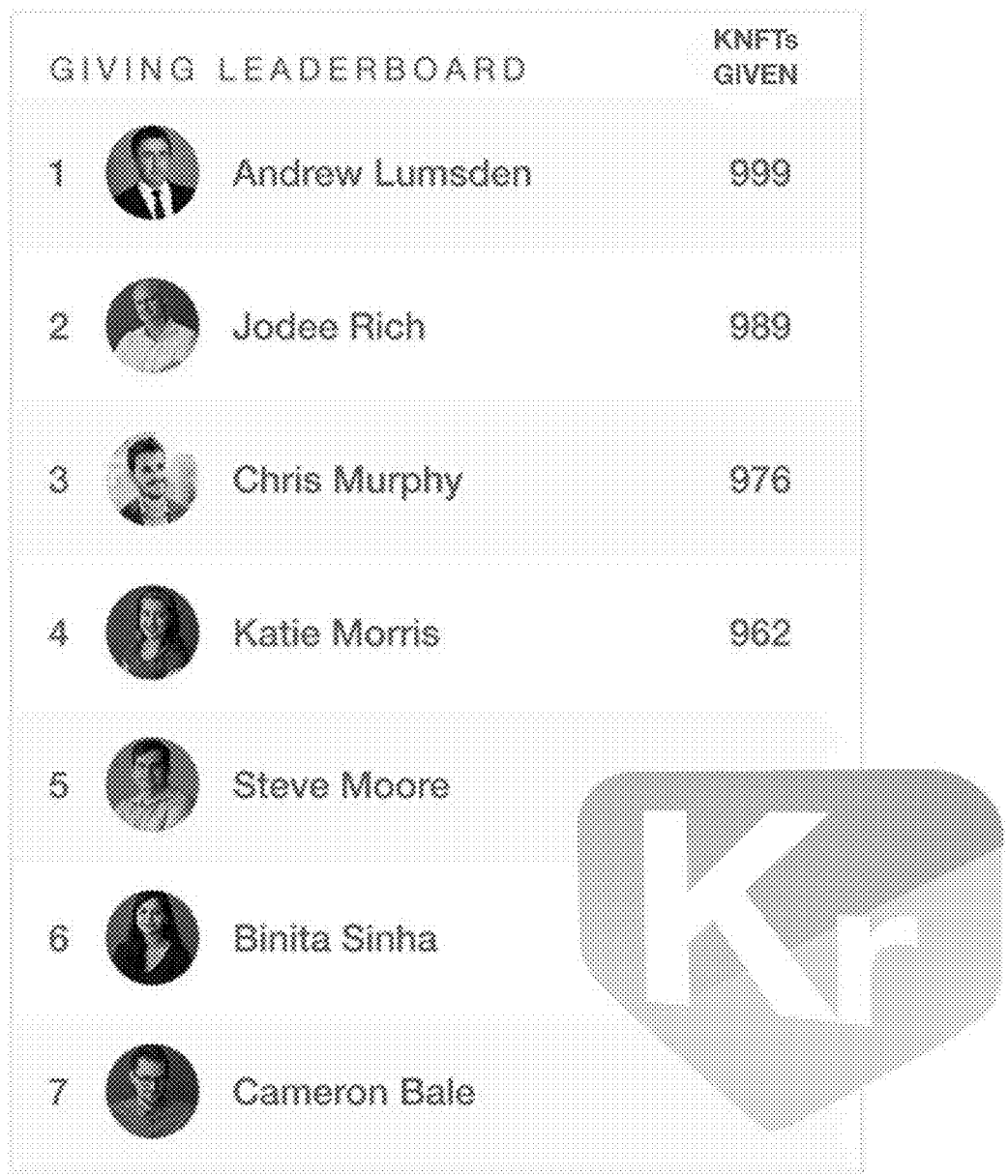
FIG. 16 depicts a leaderboard of global KNFT givers, according to aspects of the present disclosure.

In embodiments of the invention reciprocal giving may be encouraged to enhance the volume of activity and marketability of the KNFTs. It has been found that encouraging giving within the network can result in a net gain to the giver. In embodiments, notifications of received KNFTs may include a call to action to give back and reciprocate the member's sharing. Member profiles may measure both a coin owner's giving and receiving. In embodiments, a global "giving leaderboard" may be implemented and made available to highlight users giving the most KNFTs. FIG. 16 illustrates such a leaderboard.

In embodiments, social activity may be encouraged by awarding registered users bonuses including KNFT coins for performing certain social actions. For example, the administrators of a KNFT channel may have a limited supply of KNFT coins to award to members of the KNFT community as a circulation bonus. In embodiments, every time that a user performs some type of social action (e.g., commenting on a KNFT, liking a KNFT), or one of the user's coins is engaged by others, the user receives a quantity of engagement points. Engagement points may be saved and accumulated and claimed a circulation bonus when a certain threshold is met. For example, the issuer of a KNFT may earn a circulation award when their coin is circulated both 100 and then 1,000 times among unique users. In alternative embodiments, a leaderboard bonus may be awarded to users based on their appearance on a giving leaderboard based upon their ranking, length of time on the leaderboard, or other factors.

By minting and gifting a coin, a user starts a chain of conversation with every member the coin is exchanged, which can be helpful in building a community. For example, a kitesurfing coin that is gifted to 100 members interested in kitesurfing, allows the user to contact and make connection requests with them. The act of gifting in itself is a gesture that invokes response and users may enjoy by gamifying the process of networking with unique coins.

In embodiments, KNFTs may be exchanged, purchased or sold on external blockchain exchanges, (e.g. OpenSea) or listed via a decentralized exchange protocol (e.g. 0x). 0x is an open protocol that is designed to offer a decentralized exchange as part of the Ethereum blockchain. 0x is made using a protocol that involves Ethereum smart contracts that allow those around the world to run a decentralized exchange.

Embodiments of the invention may include an open 0x relay. This exposes KNFTs that are listed for sale to other exchanges, and allow the other exchanges to fill trade offers for KNFTs on behalf of their users. Fulfillment by other exchanges is via the 0x smart contracts, allowing peer-to-peer exchanges of Ethereum tokens. Embodiments of the invention may include functionality to allow KNFTs listed on the NFT.Kred Marketplace to automatically publish to the Kred 0x relay.

Newsfeed

In embodiments, registered members may have a profile featuring their newsfeed. The news feed may show a user to whom their KNFT is touching, how it is gaining momentum and rising above the background noise of social network actions. In some embodiments, the news feed may contain:

(1) comments added to the user's KNFT and KNFT that the user has touched; (2) transfers of issued KNFTs touched by the user; (3) new KNFTs issued by the user's connections; (4) new connection requests; (5) new KNFT coins earned, among others; (6) listing KNFTs in the marketplace; (7) purchase of KNFTs; and (8) request of KNFTs.

Figure 17:
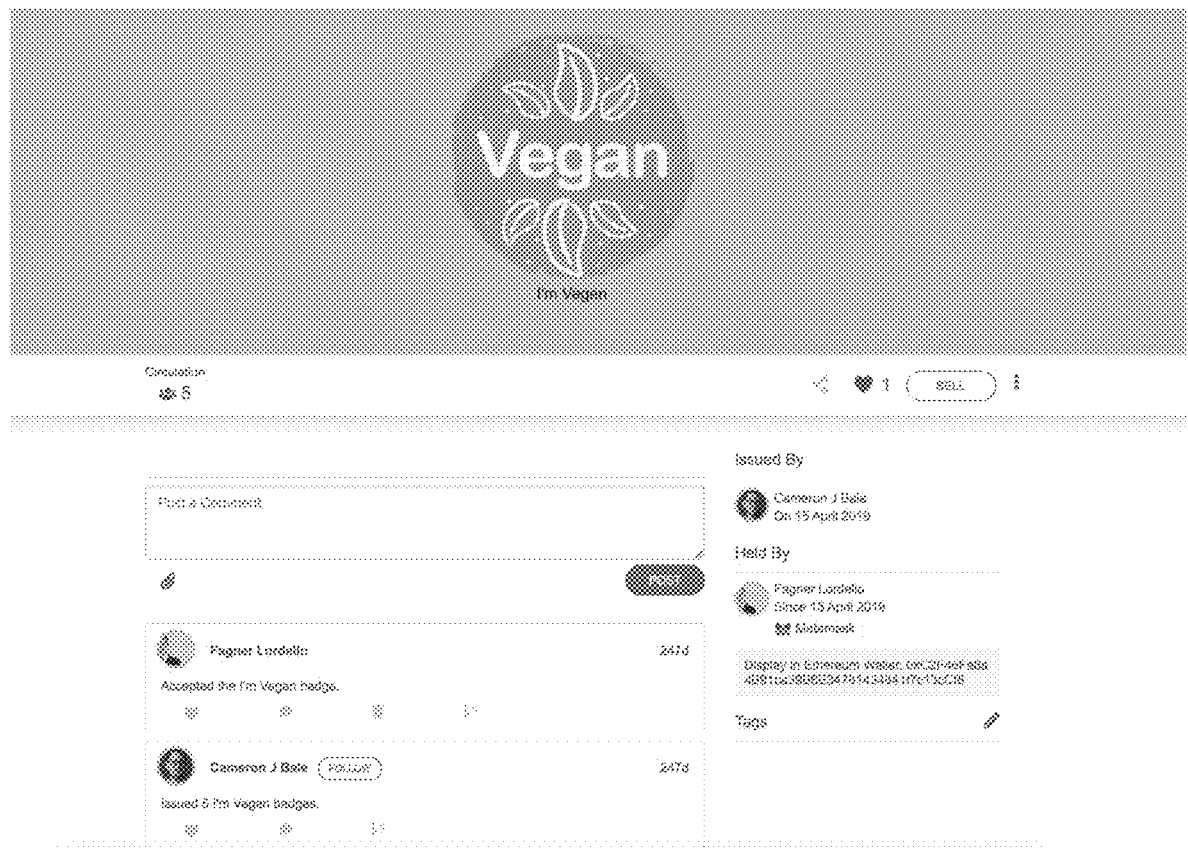
FIG. 17 depicts an exemplary newsfeed providing information to users on KNFT activity, according to aspects of the present disclosure.

An exemplary newsfeed segment is shown in FIG. 17.

Marketplace

Figure 18:
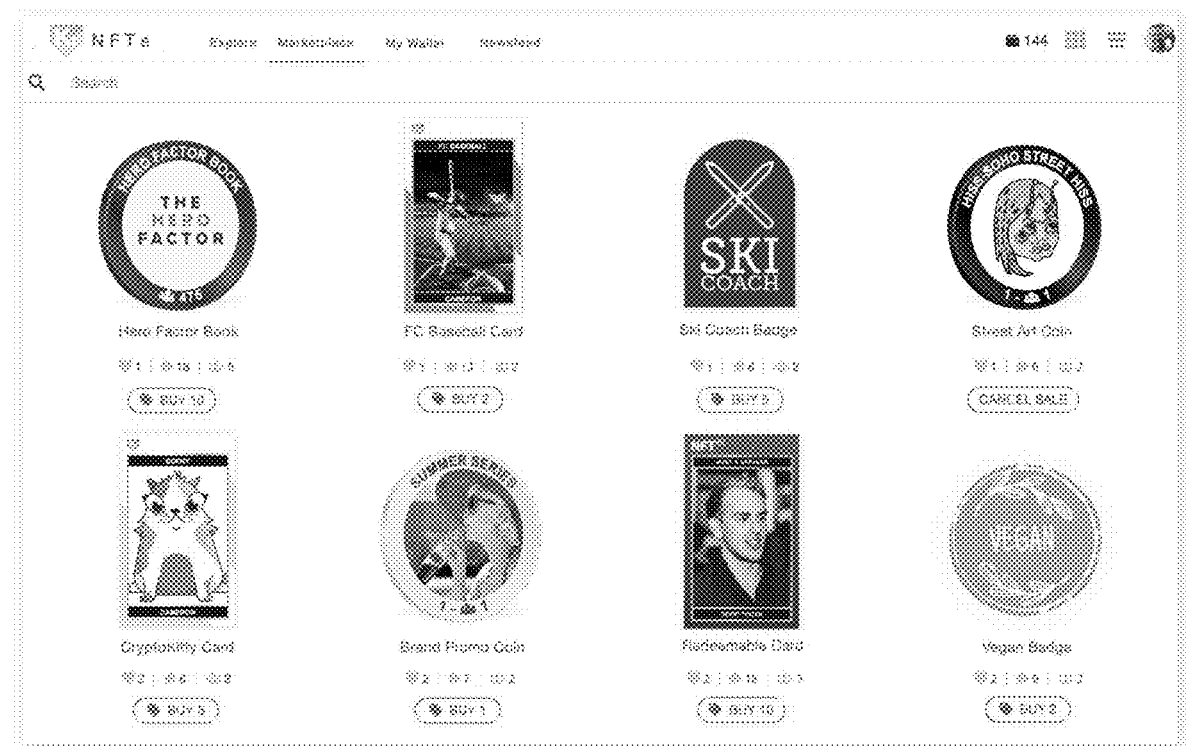
FIG. 18 illustrates an exemplary marketplace for buying, selling and auctioning KNFTs, according to aspects of the present disclosure.

In embodiments, a marketplace may be implemented for buying, selling and auctioning KNFTs. KNFTs can be sold in the currency of choice by the KNFTs creator. FIG. 18 illustrates an exemplary marketplace.

Occasionally, special edition KNFT may be issued in the marketplace for purchase with BTC or ETH at a Dutch auction.

In embodiments, collectible KNFTs that a user has worked to customize, mint, and issue can be sold in an online marketplace. For example, an artist who has garnered positive reviews from media outlets and publishers illustrates and issues his own limited artists series of KNFTs. By auctioning these limited edition KNFTs in the marketplace, artist can potentially sell each KNFT for its market price.

Profits can be made on trades. For example, the series of KNFTs mentioned above is noticed by an art collector browsing the marketplace. Believing that the series of KNFTs will be popular, the collector contacts the artist, who is thrilled with the collector's interest and gives the KNFT for free. The collector holds the KNFT until artist series gain notoriety, and then auctions the older KNFT.

KNFT Circulation Trail

In embodiments of the invention, KNFTs may contain a social capital component. The party taking ownership of a KNFT is then registered as part of a circulation trail for that KNFT, showing exactly who else has held the KNFT in the past, and allowing the owner to request a connection with them.

The value of a KNFT can fluctuate depending on the number and nature of participants in the circulation trail, with influencers and celebrities perhaps causing an increase in value, for example. A KNFT that has been "touched" by a famous musician might be worth more in the marketplace because of the connection to that musician and potential for contacting the musician.

Figure 19:
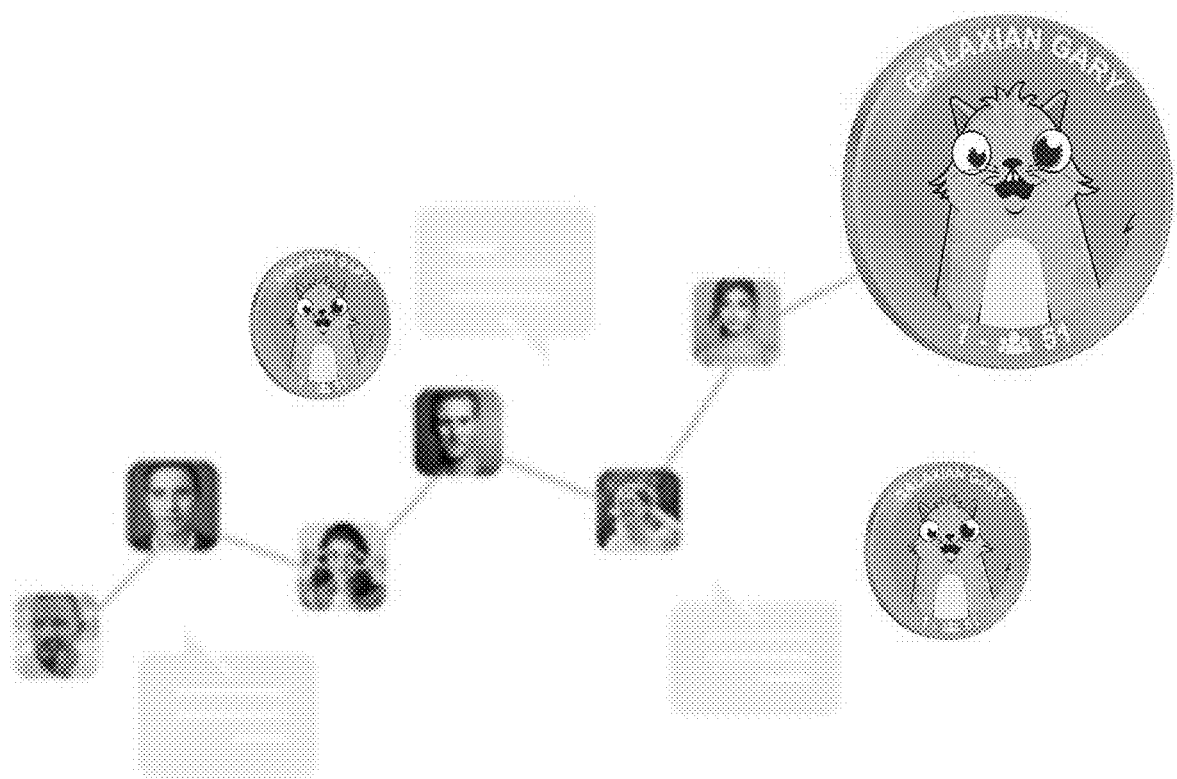
FIG. 19 illustrates a exemplary circulation trail for a KNFT, according to aspects of the present disclosure.

A conceptual representation of this network is displayed in FIG. 19.

An exemplary trail of comments associated with a KNFT coin is shown in FIG. 20.

The KNFT Wallet Collection

Every KNFT user may have a wallet collection that showcases: (1) currently held KNFTs; and (2) previously held KNFT that the user had in their possession in the past and then given or sold. These KNFTs are displayed so that a user can access their KNFT Profiles. Clicking on any KNFT in the wallet collection takes a user to its profile where they can see the circulation and conversation associated with that KNFT. The KNFT wallet collection may be implemented in any number of ways including a SaaS portal, mobile app, or dedicated application.

Figure 21:
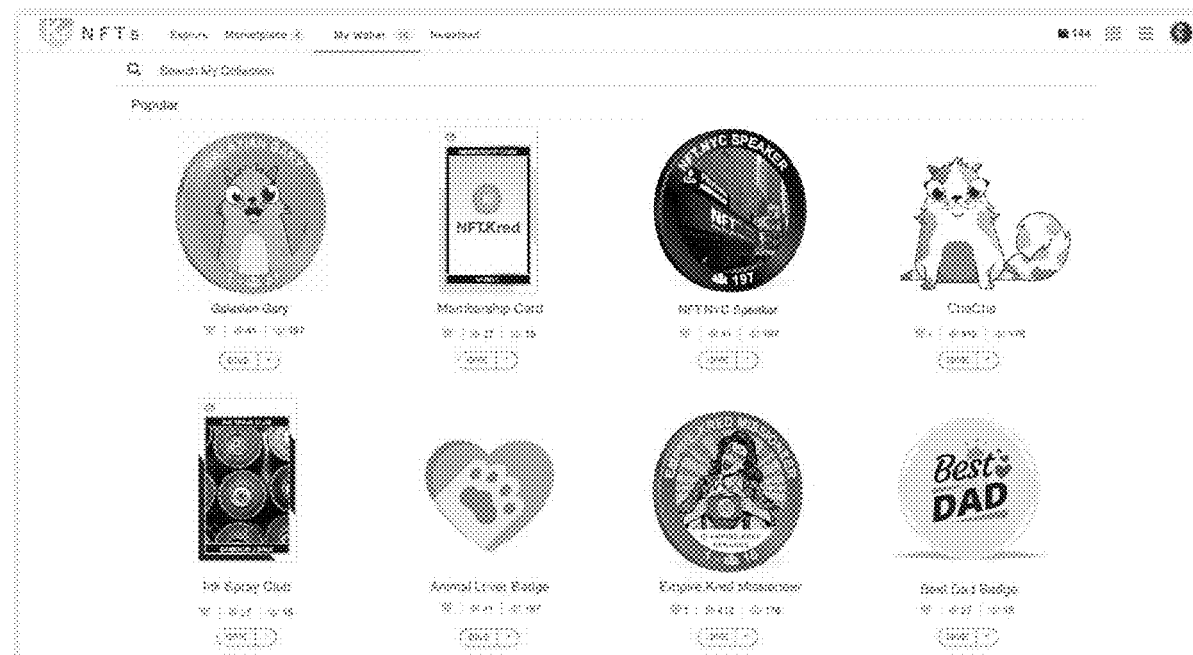
FIG. 21 depicts an exemplary KNFT coin wallet, according to aspects of the present disclosure.

Each KNFT in the wallet collection may also have a market price on the KNFT platform. The market price depends on what buyers on the platform are willing to pay for the KNFT. An exemplary KNFT coin wallet collection is shown in FIG. 21.

Sample KNFT Use Cases

The following images of KNFTs suggest potential use cases for embodiments of the present invention, including social networking and collectible. It will be appreciated by those of ordinary skill in the art that these are merely examples and not meant to be an exhaustive list of available usage.

Figure 22:
FIG. 22 depicts a variety of exemplary KNFT use cases, according to aspects of the present disclosure.

Referring to the examples in FIG. 22, potential uses include: (1) a Downloadable PFT Report ("NFT Yearly Report"); (2) a Discount on Digital Art ("20% OFF DADA"); (3) a Free Chapter and discount of a Book ("Hero Factor Book"); (4) an hour with a Speaker ("Meet David Pakman"); a digital Membership Card ("Joe's Pizza"); (5) an NFT Ticket to an event ("NFT.NYC Lifetime Pass"); (6) an Attestation Token ("Sam and Amanda's Vows"); (7) a Coupon ("30% OFF on Shopify"); (8) an Achievement Badge ("NFT Trivia Champion"); and (9) a bonus for an online game ("EK VIP Players"). The number of KNFTs issued in each use case may depend on the nature of the person or event commemorated.

Figure 23:
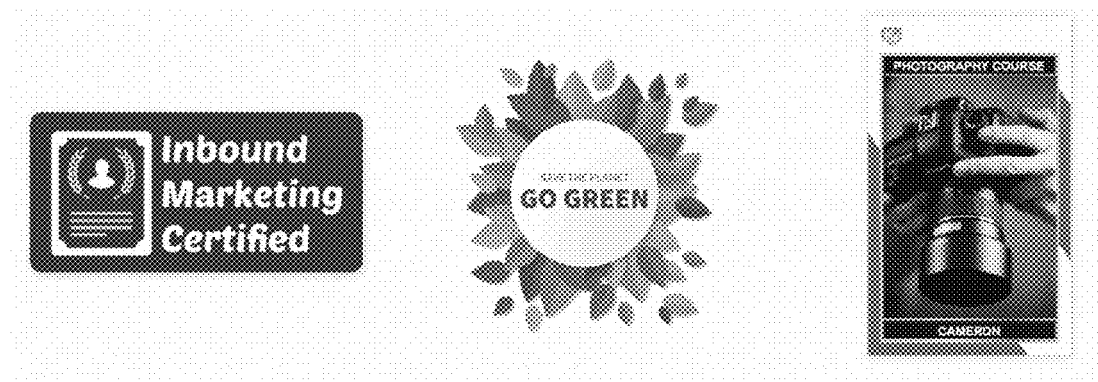
FIG. 23 depicts a KNFT as part of a batch that commemorates an event and is likely to be kept rather than passed on by owners, according to aspects of the present disclosure.

In embodiments, the KNFT may be part of a batch that commemorates an event and is likely to be kept rather than passed on by owners. Potential use cases include: (1) a certificate for a course; (2) a badge for a cause; or (3) a redeemable offer, as illustrated in FIG. 23.

Sample Kred Domain Token Application

The embodiments of the present invention enable multiple KNFT use cases, including a Kred Domain Token. A Kred Domain Token is an ENS compliant ERC721 Ethereum token. It controls a .Kred DNS domain name with an ENS NFT recorded on the Ethereum blockchain network. Ownership of a Kred Domain Token allows a user to manage DNS settings for the associated domain, and have those changes propagated to the ICANN DNS infrastructure.

Figure 24:
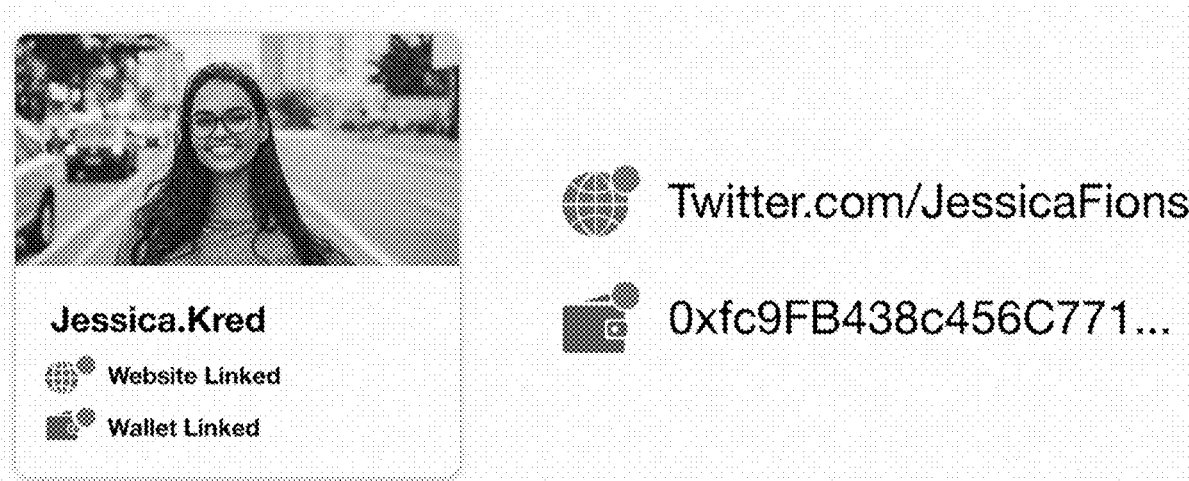
FIG. 24 depicts a rendering of the user-facing elements of a Kred Domain Token, according to aspects of the present disclosure.

The Kred Domain Token may be tradable. Transferring a Kred Domain Token to another person will give them control of the domain's ENS and DNS records. The Kred Domain Token may also be synced to the DNS Ethereum Blockchain such that EthDNS entries written to the Kred Domain Token are propagated onto the DNS infrastructure Kred's Registrar. The Kred Domain Token may also carry a royalty for the original domain name owner. A rendering of the user-facing elements of a Kred Domain Token is shown in FIG. 24.

Sample Locked Offer Application

Figure 25:
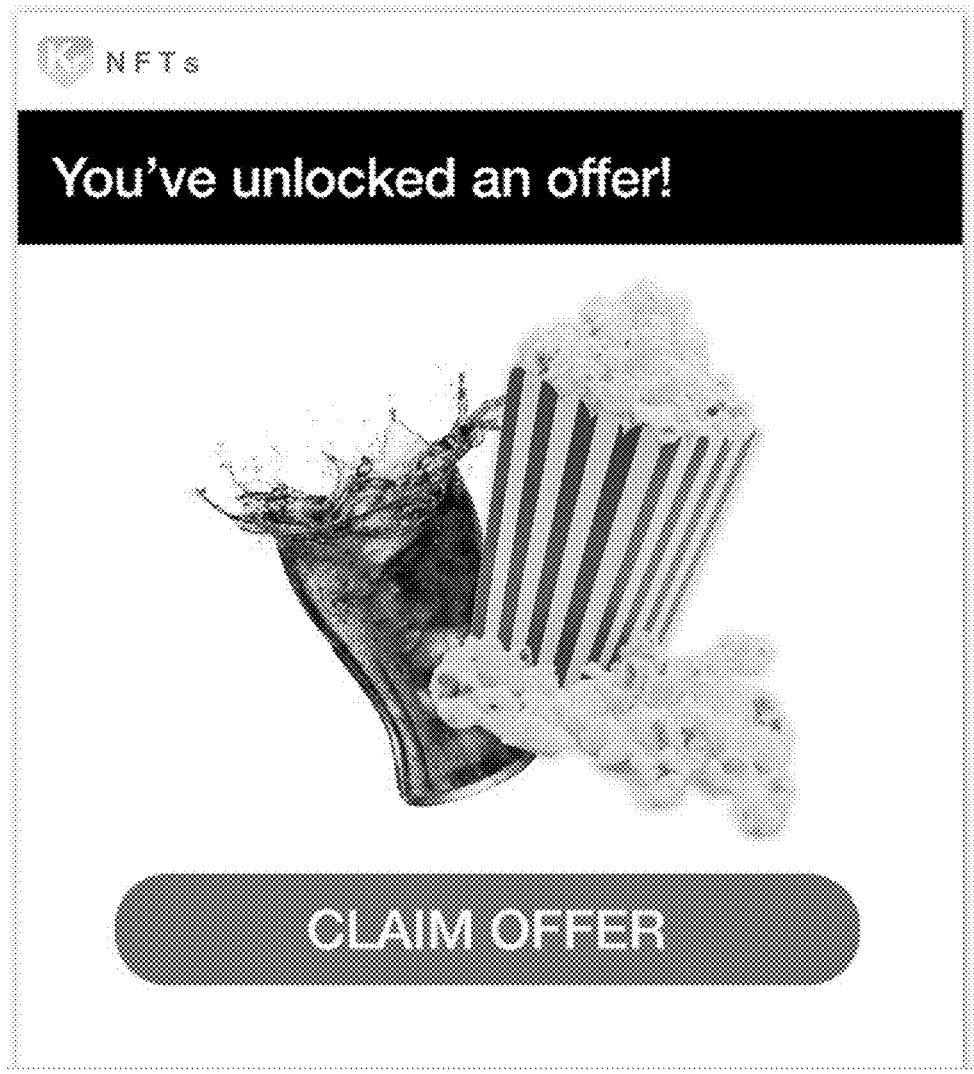
FIG. 25 depicts a locked offer notification, according to aspects of the present disclosure.

When creating a new NFT, a user can elect to add a Locked Offer. Locked Offers reveal an exclusive redemption link to token holders who meet specified criteria, for example those who also hold another specific token, a complete set of tokens, or those who provide a required piece of information, like an email or link. FIG. 25 contains an illustration of a locked offer notification.

Sample Group Meeting Token Application

Group Meeting Tokens help meeting and event organizers gamify and encourage RSVPs. When creating a Group Meeting Token, the issuer provides the details of the event or meeting, and a minimum and maximum number of RSVPs. Event details are released to those who have RSVPd only once the minimum RSVP threshold has been reached, saving the user from turning up to a party with no friends. FIG. 26 contains an illustration of one such Group Meeting Token.

Developer Marketplace

In embodiments, the KNFT platform provides developers with a rich API and sandbox environment for experimenting and building social applications with KNFT. Exemplary applications are shown in FIG. 27.

In embodiments, a KNFT API is a hybrid centralized and decentralized platform that API provides a single, easy-to-use method to integrate applications with all the functionality of KNFTs. In a preferred embodiment, the API embodiment may include methods for:

(1) KNFT design and minting: The first section revolves around the creation of KNFTs. KNFTs can be singletons, or part of a batch of numbered but otherwise identical tokens. KNFTs have a variety of display metadata, and several token types can have extra functionality, depending on the type—for example some token types can have urls associated with them for special offer redemption, or unlock functionality when a group of associated tokens are owned. All tokens are associated with an activity stream—token holders are able to connect with each other, via the token.

(2) Foreign token importing: The API embodiment may also allow the importing of other Ethereum NFTs into wallets on the selected blockchain, with the creation of appropriate metadata in our system. This allows bundling, the addition of social actions, tagging, searching, and the like to Non Fungible Tokens that do not possess those features natively.

(3) Bundles: KNFTs, and batches of KNFTs cans be associated into bundles to easily enable distribution of KNFTs to people. Embodiments may include a variety of rules that can be configured for a bundle including random distribution of KNFTs at specified rates, exclusive KNFTs, and progressive delivery of KNFTs as the bundle is added to or new subscribers join in after the bundle token distribution has commenced.

(4) Social Actions: each KNFT has an activity feed, and these feeds may be aggregated by KNFT bundle, or a wallet collection feed for each user. KNFT holders can like and add comments to individual KNFTs, and between users' conversations can evolve around the KNFTs and batches of KNFTs. It's also possible to mesh KNFTs together to merge the activity around related KNFTs.

(5) Tagging and searching: KNFTs may be tagged by their holders and there is a search functionality around the KNFTs known to the API so it's possible to locate tokens the user may be interested in and to group KNFTs by whatever attribute the user desires (6) Requesting, Sharing and Marketplace: once a user has located a KNFT of interest to them, there are API functions allowing you to request the token from the current holder, or to put a marketplace offer in for the KNFT. Likewise, there are methods to send a KNFT to another user or wallet, to put a hold on a KNFT for a specified user to claim it, or to list a KNFT for sale. Ethereum KNFT sale transaction may be handled by our OpenSea, or 0x protocol integrations, depending on the holder's preferences.

(7) Authentication: Developers of applications may be able to authenticate their users against our APIs using our OAuth2 provider implementation, avoiding the need to store user passwords but letting them interact with the APIs in a secure manner.

Additional Implementation Notes

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description.

We claim:

1. A distributed computing platform for creating actional digital assets and tokens incorporating influence and outreach, comprising:
    a KNFT application server configured to receive, over a distributed computing network from a remote computing node, a request for a new non-fungible token ("KNFT") wherein the KNFT comprises a unique KNFT identifier, a count of number of circulations of the KNFT at least one metadata element, and at least one social vector;
    a blockchain proxy server operatively connected to the KNFT application server and to a distributed blockchain ledger, the blockchain proxy server configured to: (a) record the unique KNFT identifier on a new transaction block with the distributed blockchain ledger; (b) receive a blockchain address and verification that the new transaction block has been recorded; and (c) monitor the blockchain and, for any transaction on the blockchain matching the blockchain address, read a transaction metadata element from the transaction data; and
    a KNFT API server operatively connected to the KNFT application server, the KNFT API server being programmed to:
    (a) write the KNFT identifier to a KNFT index;
    (b) receive a blockchain address from the blockchain proxy server identifying the new KNFT the blockchain proxy server to record, on a new transaction block with the distributed block;
    (c) store, on a data store comprising physical, non-transient, electronic storage media, at least one metadata component associated with the KNFT, and link the same to the KNFT index;
    (d) track engagement with the KNFT by scanning at least one public social media feed for any social action referencing the blockchain address and updating the social vector to reflect the reference.

2. The distributed computing platform of claim 1 wherein the social action comprises any of a: user comment, connection, direct message, like, or favorable rating.

3. The distributed computing platform of claim 1 wherein a change in ownership of the KNFT is written to the social vector by the KNFT API.

4. The distributed computing platform of claim 1 wherein the social vector comprises social vector data from at least one prior owner.

5. The distributed computing platform of claim 1 wherein the KNFT further comprises a circulation trail vector that incorporates the ownership history of the KNFT.

6. The distributed computing platform of claim 1 wherein the social vector comprises a metric representing a score and points related to the influence and outreach of the owner.

7. The distributed computing platform of claim 1 wherein the data store comprises a cloud storage system.

8. The distributed computing platform of claim 1 wherein the data store comprises a peer-to-peer distributed storage system.

9. The distributed computing platform of claim 1 wherein the blockchain is interoperable with any of the Stellar, Ethereum, Loom, POA, or Kaleido networks.

10. The distributed computing platform of claim 1 wherein the KNFT metadata element is one of: token template, name, type, layout, action type, media, color, pattern, batch size, and delivery effect.

11. The distributed computing platform of claim 1 wherein the ownership of a KNFT may be shared amongst a number of users, each user having a corresponding voting right to take actions on the KNFT.

12. The distributed computing platform of claim 1 wherein the KNFT further comprises a DNS and ENS reference to an internet domain, enabling the holder to access the DNS and ENS settings for the domain.

13. A method for creating actional digital assets and tokens incorporating influence and outreach, comprising:
    employing a KNFT application server to receive, over a distributed computing network from a remote computing node, a request for a new non-fungible token ("KNFT") wherein the KNFT comprises a unique KNFT identifier, a count of number of circulations of the KNFT, at least one metadata element, and at least one social vector;
    employing a blockchain proxy server operatively connected to the KNFT application server and to a distributed blockchain ledger, the blockchain proxy server configured to: (a) record the unique KNFT identifier on a new transaction block with the distributed blockchain ledger; (b) receive a blockchain address and verification that the new transaction block has been recorded; and (c) monitor the blockchain and, for any transaction on the blockchain matching the blockchain address, read a transaction metadata element from the transaction data; and
    employing a KNFT API server operatively connected to the KNFT application server, the KNFT API server being programmed to:
    (a) write the KNFT identifier to a KNFT index;
    (b) receive a blockchain address from the blockchain proxy server identifying the new KNFT the blockchain proxy server to record, on a new transaction block with the distributed block;
    (c) store, on a data store comprising physical, non-transient, electronic storage media, at least one metadata component associated with the KNFT, and link the same to the KNFT index;
    (d) track engagement with the KNFT by scanning at least one public social media feed for any social action referencing the blockchain address and updating the social vector to reflect the reference.

14. The method of claim 13 wherein the social action comprises any of: user comment, connection, direct message, like, or favorable rating.

15. The method of claim 13 wherein a change in ownership of the KNFT is written to the social vector by the KNFT API.

16. The method of claim 13 wherein the social vector comprises social vector data from at least one prior owner.

17. The method of claim 13 wherein the KNFT further comprises a circulation trail vector that incorporates the ownership history of the KNFT.

18. The method of claim 13 wherein the social vector comprises a metric representing a score and points related to the influence and outreach of the owner.

19. The method of claim 13 wherein the data store comprises a cloud storage system.

20. The method of claim 13 wherein the data store comprises a peer-to-peer distributed storage system.

21. The method of claim 13 wherein the blockchain is interoperable with any of the Stellar, Ethereum, Loom, POA, or Kaleido networks.

22. The method of claim 13 wherein the KNFT metadata element is one of: token template, name, type, layout, action type, media, color, pattern, batch size, and delivery effect.

23. The method of claim 13 wherein the ownership of a KNFT may be shared amongst a number of users, each user having a corresponding voting right to take actions on the KNFT.

24. The method of claim 13 wherein the KNFT further comprises a DNS and ENS reference to an internet domain, enabling the holder access to the DNS and ENS settings for the domain.

\* \* \* \* \*